(12) United States Patent
Kang et al.

(10) Patent No.: US 10,164,239 B2
(45) Date of Patent: Dec. 25, 2018

(54) ENERGY STORAGE DEVICE BASED ON NANOCRYSTALS INCLUDING METAL OXIDE RESCALED BY LITHIATION AND SUPERCAPACITOR USING THE SAME

(71) Applicant: KOREA ADVANCED INSTITUTE OF SCIENCE AND TECHNOLOGY, Daejeon (KR)

(72) Inventors: Jeung-Ku Kang, Daejeon (KR); Kyung-Min Choi, Daejeon (KR); Dong-Ki Lee, Daejeon (KR); Il Woo Ock, Daejeon (KR); Jung-Hyo Park, Daejeon (KR); Hyung-Mo Jeong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 409 days.

(21) Appl. No.: 14/754,478

(22) Filed: Jun. 29, 2015

(65) Prior Publication Data

US 2016/0172120 A1    Jun. 16, 2016

(30) Foreign Application Priority Data

Dec. 16, 2014  (KR) .......................... 10-2014-0181261

(51) Int. Cl.
*H01M 4/133* (2010.01)
*H01M 4/04* (2006.01)
(Continued)

(52) U.S. Cl.
CPC .......... *H01M 4/0402* (2013.01); *H01G 11/06* (2013.01); *H01G 11/28* (2013.01);
(Continued)

(58) Field of Classification Search
CPC ........ H01G 11/36; H01G 11/06; H01G 11/28; H01G 11/46; H01G 11/50; H01M 4/366;
(Continued)

(56) References Cited

U.S. PATENT DOCUMENTS

| 2012/0140378 A1* | 6/2012 | Tan ........................ H01G 11/02 361/500 |
| 2013/0244107 A1* | 9/2013 | Rojeski ................. H01M 4/131 429/211 |

FOREIGN PATENT DOCUMENTS

KR    10-1199004 B1    11/2012
KR    10-2013-0028423 A    3/2013

OTHER PUBLICATIONS

English abstract of KR 10-2013-0028423 A, as captured from KIPO website on Nov. 4, 2015.
(Continued)

*Primary Examiner* — Gary D Harris
(74) *Attorney, Agent, or Firm* — Medler Ferro Woodhouse & Mills PLLC

(57) ABSTRACT

Disclosed is an energy storage device based on metal oxide nanocrystals resealed through lithiation, and a supercapacitor using the same. The energy storage device is fabricated by dispersing transition metal nanoparticles over a carbon-based support with a large specific surface area, and then, dispersing and resealing the nanoparticles over the support using lithium ions with strong reductive ability, so that the resealed metal particles are substantially particles dispersed and resealed over the support as particles having a size of less than 1 nanometer on the scale of atomic units. The supercapacitor is fabricated using the energy storage device. The energy storage device higher capacitance than before resealing of metal oxide. Since the resealed metal particles are those having a size of less than 1 nanometer on the scale of atomic units, interference between particles disappears to (Continued)

exhibit excellent cycle life characteristics of 100% maintained performance in even more than 100,000 cycles.

4 Claims, 29 Drawing Sheets

(51) Int. Cl.
    *H01G 11/36*     (2013.01)
    *H01M 4/36*     (2006.01)
    *H01M 4/131*     (2010.01)
    *H01M 4/485*     (2010.01)
    *H01M 4/505*     (2010.01)
    *H01M 4/525*     (2010.01)
    *H01M 4/1391*     (2010.01)
    *H01G 11/06*     (2013.01)
    *H01G 11/28*     (2013.01)
    *H01G 11/46*     (2013.01)
    *H01G 11/50*     (2013.01)
    *H01M 4/1393*     (2010.01)
    *H01M 10/0525*     (2010.01)

(52) U.S. Cl.
    CPC ............ *H01G 11/36* (2013.01); *H01G 11/46* (2013.01); *H01G 11/50* (2013.01); *H01M 4/0471* (2013.01); *H01M 4/131* (2013.01); *H01M 4/1391* (2013.01); *H01M 4/366* (2013.01); *H01M 4/485* (2013.01); *H01M 4/505* (2013.01); *H01M 4/525* (2013.01); *H01M 4/133* (2013.01); *H01M 4/1393* (2013.01); *H01M 10/0525* (2013.01); *Y02E 60/13* (2013.01)

(58) Field of Classification Search
    CPC ...... H01M 4/131; H01M 4/485; H01M 4/505; H01M 4/525; H01M 4/1391; H01M 4/0471; H01M 4/0402; H01M 4/1393; H01M 10/0525; H01M 4/133; Y02E 60/13
    USPC ..................................................... 429/231.4
    See application file for complete search history.

(56) References Cited

OTHER PUBLICATIONS

English abstract of KR 10-1199004 B1, as captured from KIPO website on Nov. 4, 2015.
Jeong et al., *Proc Natl Acad Sci USA* 112(26):7914-7919 (2015).

* cited by examiner

A. NiO + graphene

B. Li + NiO + graphene

ENERGY STORAGE DEVICE BASED ON NANOCRYSTALS INCLUDING METAL OXIDE RESCALED BY LITHIATION AND SUPERCAPACITOR USING THE SAME

This application claims priority to Korean Patent Application No. 10-2014-0181261, filed on Dec. 16, 2014 in the Korean Intellectual Property Office, the entire disclosure of which is incorporated herein by reference.

FIELD OF THE INVENTION

The present invention relates to an energy storage device based on metal oxide nanocrystals rearranged ('resealed') using lithium, and a supercapacitor using the same, and more particularly, to an energy storage device fabricated by dispersing transition metal nanoparticles over a carbon-based support with a large specific surface area, and then, dispersing and resealing the nanoparticles over the support using lithium ions with strong reductive ability, so that the resealed metal particles are dispersed and resealed over the support as particles having an average 0.6 nanometer size on the scale of atomic units, and a supercapacitor fabricated by using the same.

Such an energy storage device based on the resealed metal particles according to the present invention has an electric capacity several times higher than before resealing of the metal oxide. Also, since the resealed metal particle is a particle having a size of less than 1 nanometer on the scale of atomic units, interference between particles disappears to achieve excellent cycle life characteristics that maintain performance of the particles even over 100,000 cycles or more.

BACKGROUND OF THE INVENTION

Representative examples of the energy storage device may include a secondary cell battery and an electrochemical capacitor. The electrochemical capacitor is generally referred to as an electric double layer capacitor, a supercapacitor, or an ultracapacitor, and serves as an energy storage device to store and supply electric energy using capacitor behavior induced by an electrochemical reaction between an electrode and an electrolyte. Since there is almost no deterioration caused by repeating charging/discharging operations, these capacitors do not need repair work, and have high efficiency and semi-permanent lifespan with rapid charge and discharge capabilities, thereby being of great interest as an energy storage device capable of replacing or being used together with the secondary battery. Accordingly, the supercapacitor among these capacitors is expected to be employed in a variety of applications, for example, an IC back-up type device for a variety of electrical and electronic equipment, a pulse power supply for portable mobile communication devices, automobiles (electric, hybrid, fuel cell), toys, solar energy storage devices, and the like. A carbon nanotube or graphene is preferably used as an electrode material for a supercapacitor due to physicochemical properties thereof.

Conventionally, development of an energy storage device using nanomaterials still involves various limitations. More particular, even when a nanoscale material is synthesized or prepared, the reaction occurs only on the surface of the synthesized material to hence lack ability to reach an inherent theoretical capacity of the material. Accordingly, studies on decreasing a size of the energy storage material and dispersing the same have attracted great interest in the art, however, the range of the size is substantially restricted to several nanometers, which in turn, results in limitation in energy storage capacity and output characteristics. In order to reach the inherent theoretical capacity of the energy storage material, a technical solution of forming the material in an atomic state rather than in a nanoscale size may be proposed. Although a bottom-up method is generally used to prepare particles, these particles often agglomerate together to hence produce nanoparticles only in the form of an aggregate of hundreds of particles.

In consideration of this circumstance, the present inventor has found that the above problem in the energy storage device based on the scale of atomic units can be experimentally overcome by synthesizing metal oxide crystals on the scale of atomic units on the surface of graphene through lithiation for the first time in the world, and has completed the present invention. This result was verified and supported from simulations involving many particles such that lithium ions react with oxygen to form a $Ni:Li_2O$ core-shell structure. Also, in order to obtain a driving force for rescaling atomic unit scale nanocrystals, positive electrode surface charges may be applied. Further, X-ray photoelectron spectroscopy and in-situ optical spectrum analysis may be used to demonstrate that rescaled divalent Ni ions are reversely changed to a zero-valent state in a lithium intercalation/deintercalation cycle. Moreover, collecting particles rescaled at the positive electrode of an asymmetric full cell may enable full extraction of electrostatic capacitance (i.e. electric capacity) at a negative electrode which is an electrode opposite to the positive electrode. Further, the stored capacitance may retain a high current density while exhibiting long-life characteristics. Consequently, a novel capacitor with a high energy density, high capacitance and long-life characteristics may be anticipated to be useable as a next-generation energy storage device with improvements.

As a prior art relating to the supercapacitor, there are many documents including Korean Patent Laid-Open Publication No. 10-2013-0028423 (entitled "electrode for supercapacitor using graphene/metal oxide nanocomposite"), which relate to a development of the electric double-layer capacitors using activated carbon, pseudo-capacitors using metal oxide and conductive polymer, are the like. In this regard, these documents have been introduced to have an electrostatic capacitance of about 1 mF to 10,000 F. Meanwhile, the invention of the above laid-opened patent discloses a technique of using high conductivity and low resistance characteristics of graphene to overcome the low resistance of metal oxide and achieve effects of imparting high electrostatic capacitance. Consequently, an energy storage power source in a new concept, that is, a high energy density type next-generation supercapacitor could be attained. Korean Patent Registration No. 10-1199004 (entitled "a nano-porous electrode for supercapacitor and a method for preparing the same") discloses a technique of mainly using metal oxide or conductive polymer as an electrode material for the supercapacitor. Among these, transition metal oxide-based raw materials are most greatly attracting public attention as such an electrode material for the supercapacitor nowadays. In particular, ruthenium oxide exhibits quite high specific condensing capacity, longer operation time, high electrical conductivity, and excellent high charge/discharge rate characteristics, and the like, and therefore, many studies have proceeded. On the other hand, the invention of the above registered patent discloses a technique of using electro-plating which involves hydrogen generation to form pores on the surface or inside of the electrode, which in turn increases a specific surface area and improves charge and discharge capacities, energy density and/or output density of the capacitor. Accordingly, as shown in FIG. 10, a ruthenium-copper porous metal structure had a specific condensing capacity of 1100 F/g, and as a result of charging/discharging over 3,000 cycles, it can be seen that this structure could retain a specific condensing capacity of about 750 to 800 F/g.

As described above, the conventional art still involves problems such as reduced charge and discharge capacities of a supercapacitor and a small number of cycles to hence entail difficulties in commercial utility thereof.

SUMMARY OF THE INVENTION

In consideration of the above-mentioned circumstances, it is an object of the present invention to provide an energy storage device based on metal oxide nanocrystals resealed using lithium, and a supercapacitor using the same.

Generally, nanocrystals are of great interest as an energy storage medium. However, due to a size of the nanocrystals, there is a limitation for application to a condenser executed by an electrochemical reaction which occurs on the surface through insertion and diffusion of ions for high efficiency energy storage. Therefore, the present inventors have found that the above problems can be experimentally overcome by synthesizing a material, which includes metal oxide crystals formed on the scale of atomic units, through lithiation on the surface of graphene. This result was verified from simulations involving many particles such that lithium ions react with oxygen to form a $Ni:Li_2O$ core-shell structure. Further, in order to obtain a driving force for resealing nanocrystals on the scale of atomic units, positive electrode surface charges may be applied. Further, X-ray photoelectron spectroscopy and in-situ optical spectrum analysis may be used to demonstrate that resealed divalent Ni ions are reversely changed to a zero-valent state during a lithium intercalation/deintercalation cycle. Moreover, collecting particles resealed at the positive electrode of an asymmetric full cell may enable full extraction of electrostatic capacitance (i.e. electric capacity) at the negative electrode which is an electrode opposite to the positive electrode. Further, the stored capacitance may retain a high current density while exhibiting long-life characteristics. (1) An energy storage system to store charge in electrochemical double layers (EDLs), and (2) a metal oxide pseudo-capacitor to store charge through redox reaction, are substantially energy storage systems with high capacitance and have the possibility of being further developed in various applications. However, in case of the electrochemical double layers, cycle characteristics may be deteriorated due to specific metal oxide and, at the same time, low capacitance is involved. Some capacitors may have lower energy density, compared to a battery. Consequently, a capacitor having overall advantages such as high energy density, high capacitance and long-life characteristics may be anticipated as an improved next-generation energy storage device. The present inventors have deduced a complete redox reaction of metal oxide by combining metal oxide particles on the scale of atomic units with graphene having high conductivity and flexibility, with the intention of producing a high performance energy storage device.

The present inventors have disclosed resealing of $Ni:Li_2O$ core-shell clusters on the scale of atomic units through lithiation of nickel oxide nanocrystals, and proved the above findings by a combination of electrode synthesis through experiments and optimization of the electrode based on ReaxFF reactive molecular dynamics. Further, based on nitrogen-doped graphene and commercially available activated carbon, the inventors have found that a positive electrode which stores resealed particles of an asymmetric supercapacitor full cell may provide a new pathway to enable complete extraction of capacitance to the negative electrode which is an electrode opposite to the positive electrode.

According to one aspect of the present invention, there is provided a method for preparing an energy storage device based on nanocrystals including transition metal oxide resealed through lithiation, which includes: reacting a carbon support and a nano-particle transition metal oxide solution to disperse the same on the support and prepare a carbon/transition metal oxide precursor; heating the transition metal oxide precursor to conduct a reductive reaction and thus synthesize carbon/transition metal nanocrystals; and dispersing a mixture of lithium ions and electrolyte in the carbon/transition metal nanocrystals, uniformly coating and drying the same to intercalate lithium ions at the atomic scale, then, washing (de-intercalating) the residual electrolyte and lithium ions to rescale the same.

The energy storage device based on resealed transition metal particles according to the present invention has a capacitance several times higher than before resealing of metal oxide. Also, since resealed metal particles have a size of less than 1 nanometer, interference between has particles disappeared so as to achieve excellent life cycle characteristics that ensure 100% performance can be maintained even over more than 100,000 cycles. Accordingly, the present invention demonstrated that the energy storage capacity of rescaled metal oxide reaches an inherent theoretical value, therefore, it may be anticipated that the above process can be introduced to an entire transition metal oxides and accomplish a variety of effects in applications involving surface reactions.

BRIEF DESCRIPTION OF THE DRAWINGS

The above and other objects, features and other advantages of the present invention will be more clearly understood from the following detailed description taken in conjunction with the accompanying drawings, in which:

FIG. 6 illustrates size and shape of NiO on graphene, wherein FIGS. 6 and 7 are TEM photographs showing the size and shape thereof, and PXRD pattern showing crystallinity, respectively;

FIG. 7 is PXRD of NiO on graphene wherein a peak at around 25° illustrates lattice spacing of graphitic carbon, while the other labeled peaks correspond to NiO (JCPDS number 71 to 1179);

FIG. 15 illustrates Raman spectra of NiO-g and resealed NiO-g, in particular, the Raman spectra of 10 nm NiO-g and resealed NiO-g. For the spectra of reNiO-g, the intensities of first longitudinal peak (547 $cm^{-1}$) and second longitudinal peak (1100 $cm^{-1}$) are increased after the resealing and this result is attributed to dispersion of resealed NiO particles. On the other hand, D and G peaks for the graphene located at 1350 and 1581 $cm^{-1}$ are not changed significantly. The D/G ratios of NiO-g (1.38) and reNiO-g (1.39) are similar;

DETAILED DESCRIPTION OF THE INVENTION

Figure 1:
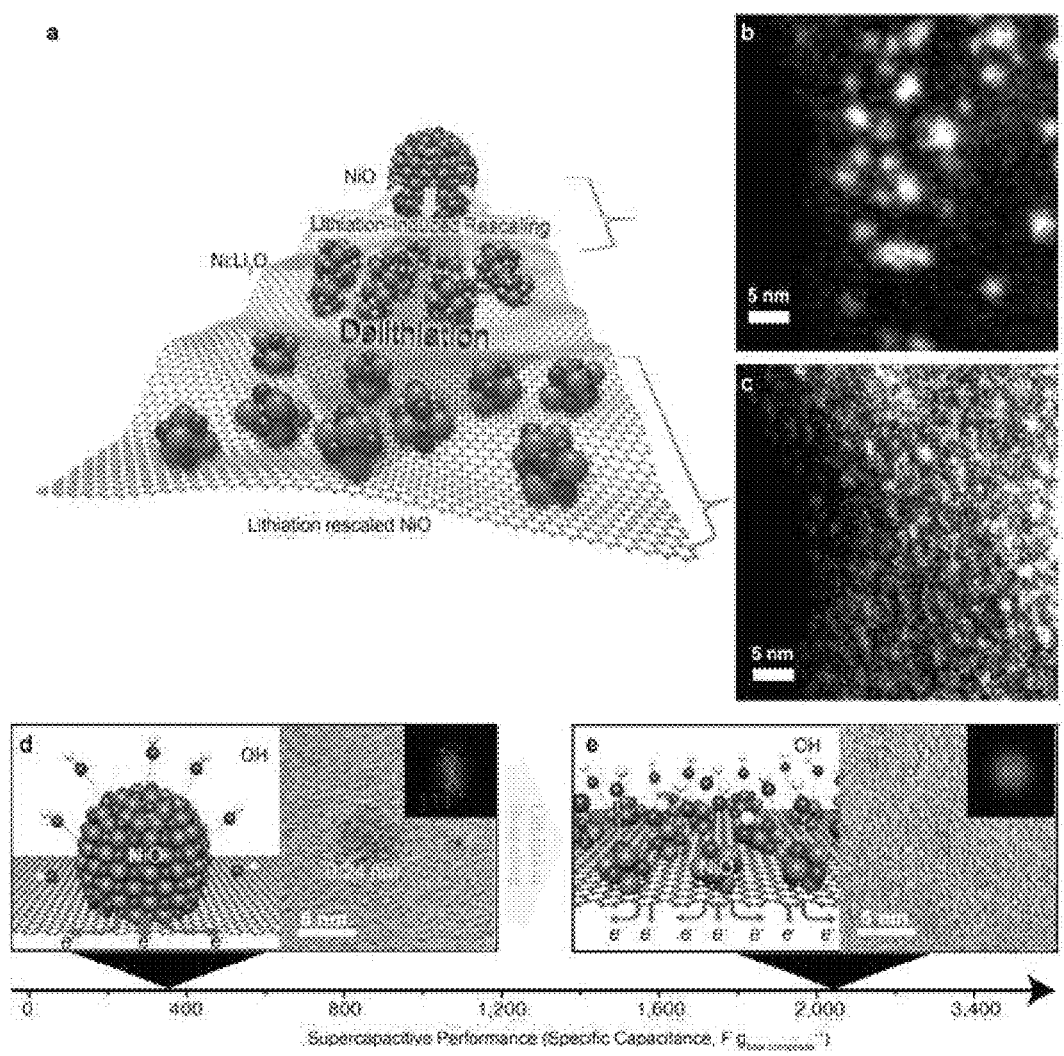
FIG. 1 illustrates a rescaling process of transition metal oxide on graphene by lithium intercalation/deintercalation ('lithiation/delithiation'). (a) A process of rescaling nickel oxide ('NiO') nanoparticles with a size of several nanometers to several angstroms through lithiation; (b) An STEM image of pure 3 nm NiO nanoparticles present on the surface of graphene; (c) An STEM image of graphene on which NiO is rescaled; (d) A TEM image of surface faradaic redox reaction mechanism of different particles before lithiation/delithiation, and NiO particles; and (e) A TEM image of surface faradaic redox reaction mechanism of different particles after lithiation/delithiation, and NiO particles.

The present invention has been implemented in sequence orders of: synthesis of graphene/transition metal oxide nanocrystals; lithiation/delithiation-induced rescaling; measurement of surface faradaic reaction of rescaled particles; preparation of a nitrogen-doped graphene (NG) electrode; and electrochemical measurement of a full cell type asymmetric supercapacitor.

All reagents used herein are commercially available from known sources (Sigma Aldrich and Merk) and used without alternative purification, unless otherwise stated. In particular, nickel acetate [Ni(CH$_3$COO)$_2$4H$_2$], an ammonium hydroxide solution (28 wt. %) and a hydrazine solution (35 wt. %) were purchased from Sigma-Aldrich Co. Ethanol, acetone and distilled water were purchased from Merck Co.

Example 1

Synthesis of Graphene/NiO Nanocrystals

Graphene oxide was dispersed in water by 1 hour of sonication (0.4, 1 and 2 mg/ml for NiO$_{30}$-g, NiO$_{50}$-g, NiO$_{70}$-g, 30 ml). Then, an appropriate amount of nickel acetate [Ni(CH$_3$COO)$_2$4H$_2$](50.9 ml, 10 mM aqueous solution) was added to obtain NiO nanoparticles on the graphene oxide solution. After additional sonification for 30 min, the mixed solution was reduced with 28 wt. % of ammonium hydroxide solution (2.8 ml) and 35 wt. % of hydrazine solution (15 ml) while stirring for 3 hours at 60° C. After filtration, the reduction product was washed with water several times and dried overnight in a vacuum oven at 60° C. to obtain black powder. These steps have been executed to produce NiO precursors coated on graphene, which was subsequently reduced by thermal chemical vapor deposition (CVD) under a hydrogen atmosphere at 300° C. for 3 hours. A final product was obtained after additional heat treatment for about 2 hours under air at 250° C. The mass of NiO particles on graphene was yielded by thermogravimetric analysis.

Lithiation Rescaling

In order to synthesize extremely fine particles, two-electrode coin cell was prepared. For performing electrochemical lithiation/delithiaton, lithium metal foil was used as a counter electrode while an electrolyte was 1M LiPF$_6$ in 1:1 volume ratio mixture of ethyl carbonate (EC) and diethyl carbonate (DEC). A NiO on graphene electrode was a working electrode formed by dispersing 10 wt. % polyvinylidene fluoride (PVDF) in N-methyl-2-pyrrolidinone (NMP) to prepare a mixture.

A mixing ratio of an active material and a binder in the mixed slurry is 9:1 by mass (weight). The black slurry was uniformly applied to the copper foil then dried overnight in a vacuum oven at 80° C. A measurement cell made of nanomaterial was assembled using a separation membrane (monolayer polypropylene separation membrane, Celgard) and electrolyte in a glove box filled with Ar gas. Preparation of atomic scale metal oxide resealed by lithiation was observed using VSP potentiostat (Bio-logic) through electrochemistry at a scan rate of 0.1 mV/s. After the preparation, in order to remove residual electrolysis and lithium ions, the sample was washed with acetone and water. Thereafter, the mass of resealed NiO particles was measured by thermogravitric analysis and inductively coupled plasma (ICP) spectrometry.

Measurement of Surface Faradaic Reaction of Resealed Particles

Electrostatic performance was determined using a three-electrode apparatus including a platinum wire (a counter electrode), Ag/AgCl electrode (containing SCE, a reference electrode) and reNiO on graphene ('reNiO-g') (resealed NiO, a working electrode). The working electrode was formed by uniformly coating a Ni foil with a slurry including the lithiation-rescaled sample and a binder (in a mass ratio of 9:1), then, drying the coated foil in a vacuum oven at 80° C. Such an electrochemical system was assembled in 1M KOH aqueous electrolyte and sealed using paraffin CV and electrostatic current of surface faradaic reaction were measured using Bio-logic VSP potentiostat. A total mass of the electrode material measured using XP2U ultrafine scale (d=0.1, Mettler Toledo) ranged from 1.3 to 1.5 mg/cm$^2$.

Preparation of Nitrogen-Doped Graphene (NG)

Graphite was first oxidized into graphene oxide (GO). The dried GO was reduced by plasma enforced chemical vapor deposition (PECVD). During this step, GO was reduced first by a hydrogen plasma process (output 500 W, hydrogen gas having a flow rate of 100 sccm under a pressure of 4 torr). Subsequently, after the reduction, nitrogen plasma (output 500 W, nitrogen gas having a flow rate of 91 sccm under a pressure of 14 torr) flowed onto the graphene, thus completing NG. Finally, the sample was heated at 300° C. for 3 hours in order to remove residual functional groups on the NG surface. The slurry was prepared by dissolving NG and PVDF (in a mass ratio of 9:1) in NMP. The slurry was applied to the Ni foil then dried overnight in a vacuum oven. A platinum core contacted with a rear face of a substrate so as to connect with an electrochemical measurement device (Bio-logic VSP).

Synthesis of Graphene Substrate-oxidized Graphene

First, graphite was oxidized into graphene oxide by Hummers' method (3). In particular, 2.0 g of graphite was dipped in an acid solution including NaNO$_3$ (1 g, 11.7 mmol) and KMnO$_4$ (6.3 g, 39.8 mmol) A color of this mixed solution was changed yellowish brown. After filtration and water washing, brown powder was yielded.

Functions of Graphene Support

Figure 22:
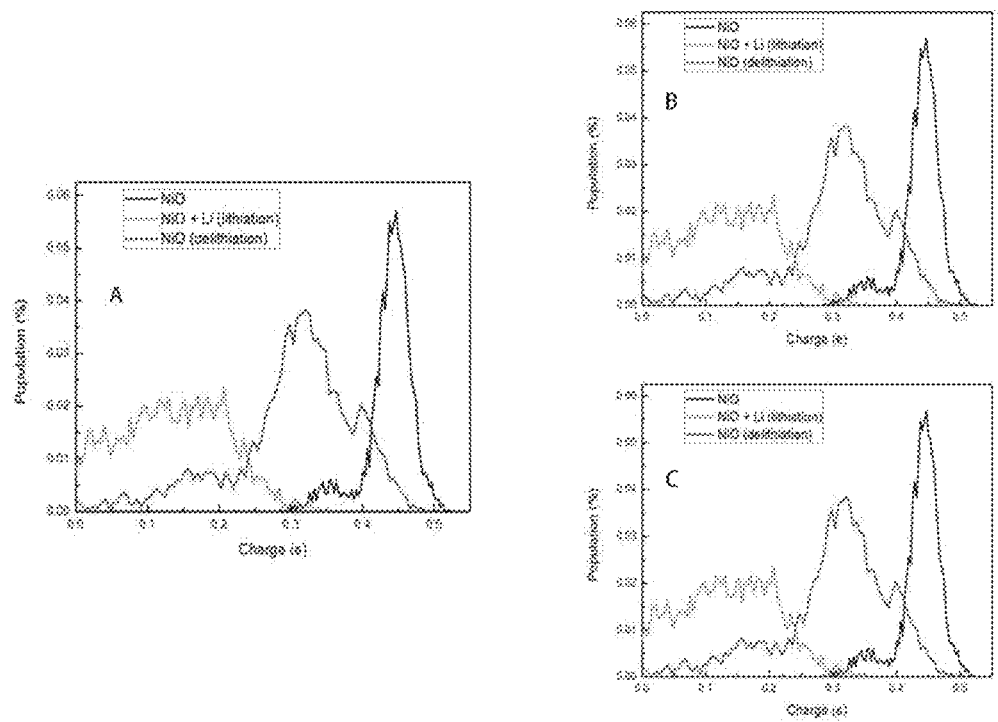
FIG. 22 illustrates comparison of atomic charge distributions in RMD simulation between three cases: (A) RMD of NiO (black), RMD of NiOLi$_2$ (green) and RMD of delithiated NiOLi$_2$ (red); (B) RMD of Ni to NiO (black), RMD of Ni to NiOLi$_2$ (green), and RMD of Ni to delithiated NiOLi$_2$ (red); and (C) RMD of Li to NiO (black), RMD of Ni to NiOLi$_2$ (green), and RMD of delithiated NiOLi$_2$ (red). The charges (in e) are obtained from the electronegativity equalization method (EEM) implemented in ReaxFF. Parameters in ReaxFF are optimized to fit Mulliken populations in QM, which allows partial covalency.

A graphene support plays a role of maintaining excellent contact with nanoparticles to thus prevent sample loss after lithiation. In fact, the percent by weight of NiO particles was well sustained even after charge/discharge cycle, as shown in TGA data and ICP analysis (FIG. 22).

Example 2-1

Resealing of Cobalt Oxide Particles Among Transition Metal

For synthesis of graphene/cobalt oxide nanoparticles, graphene oxide was dispersed in water by 1 hour sonication (1 mg/ml, 30 ml). Then, an appropriate amount of cobalt acetate [Co(CH$_3$COO)$_2$4H$_2$](51 ml, 10 mM aqueous solution) was added to obtain Co$_3$O$_4$ particles in the graphene oxide solution. After additional sonication for 30 minutes, the mixed solution was reduced with 28 wt. % ammonium hydroxide solution (2.8 ml) and 35 wt. % hydrazine solution (15 ml) while stirring for 3 hours at 60° C. After filtration, the reduction product was washed with water several times and dried overnight in a vacuum oven at 60° C. to obtain black powder. These steps have been executed to produce a graphene substrate coated with cobalt precursor, which was subsequently reduced by thermal chemical vapor deposition (CVD) under a hydrogen atmosphere at 300° C. for 3 hours. A final product was obtained after additional heat treatment for about 2 hours under air at 250° C. Hereinafter, lithiation-induced rescaling, measurement of surface faradaic reaction of rescaled particles, preparation of nitrogen-doped graphene electrode, synthesis of graphene substrate-oxidized graphene, or the like, have been conducted according to Example 1, thus completing production and measurement of performances.

Example 2-2

Rescaling of Iron Oxide Particles Among Transition Metal

Production and measurement of performances have been conducted by the same procedures as described in Example 2-1 except that iron oxide was used instead of nickel oxide.

Example 2-3

Rescaling of Manganese Oxide Particles Among Transition Metal

Production and measurement of performances have been conducted by the same procedures as described in Example 2-1 except that manganese oxide was used instead of nickel oxide.

Example 2-4

Rescaling of Titanium Oxide Particles Among Transition Metal

Production and measurement of performances have been conducted by the same procedures as described in Example 2-1 except that titanium oxide was used instead of nickel oxide.

Example 2-5

Rescaling of Strontium Oxide Particles Among Transition Metal

Production and measurement of performances have been conducted by the same procedures as described in Example 2-1 except that strontium oxide was used instead of nickel oxide.

Example 3

Fabrication of Supercapacitor System Having an Asymmetric Cell (reNiO-g/NG)

In order to evaluate possibility of using resealed NiO-g as a practical capacitor device, an electrode was fabricated in a coin type cell. Unlike an electrical double layer capacitos or some examples of pseudo-capacitor based on electrodes such as graphane, activated carbon and MnO$_2$, it is difficult to design a symmetric two electrode supercapacitor based on NiO electrodes. This is because the redox reaction of NiO cannot accommodate anions from the aqueous electrolyte during charging. Only a small, double layer capacitor may contribute to capacitance at the negative electrode during charging. For this reason, in order to evaluate capacitive performance of the resealed NiO-g electrode in a practical device, an asymmetric capacitor was fabricated using resealed NiO-g as a positive electrode and nitrogen-doped graphene (NG) as a negative electrode. The NG electrode acting as the negative electrode may accept anions from the electrolyte when the call is charged. Based on the specific capacitance of each electrode and the principle of charge between two electrodes, the mass ratio of reNiO$_{70}$-g to NG was determined to be 0.344. A total mass of active material on the negative electrode was 2 mg/cm$^2$, while on the positive electrode it was 0.7 mg/cm$^2$. Considering the high applied voltage (1.6 V) and whole capacitance, it can be found that the assembled cell based on NG and reNiO$_{70}$-g has energy density of 78.6 Wh/kg at power density of 951.6 W/kg and energy density of 33.2 Wh/kg at power density of 21.4 kW/kg, thereby accomplishing high performance. The energy density values obtained using reNiO-g as the asymmetric electrode are very promising. These results support that reNiO-g can be adopted as a counter electrode enabling high energy density based on availability of other high capacitance working electrodes while maintaining high power and long cycle life, thereby providing great promise for energy storage devices.

Example 4

Fabrication of Supercapacitor System Having an Asymmetric Cell (reNiO-g/AC)

In order to fabricate an asymmetric supercapacitor system (reNiO-g/AC), first, the present inventors fabricated an asymmetric capacitor using resealed NiO-g as a positive electrode and activated carbon (AC) as a negative electrode. Based on the specific capacitance of each electrode and the principle of charge balance between two electrodes, the mass ratio of reNiO$_{70}$-g to AC was determined to be 0.125 (based on specific capacitance from CV measurement at 5 mV/s). The total mass of active material on the negative electrode was 5.6 mg/cm$^{-2}$ while on the positive electrode it was 0.7 mg/cm$^{-2}$.

Experimental Example

X-Ray

Powder X-ray data were collected using a SmartLab θ-2θ diffractometer with Bragg-Brentano geometric reflectance involving Cu $K_{\alpha 1}$ radiation at 1200 W (40 kV, 30 mA) filtered by a Johansson type Ge (111) monochromator, which is equipped with a high speed 1D detector (D/teX Ultra). The desquamated powder from the NiO on graphene was held in a holder stage and scanned at a scan speed of 2°/min in a continuous mode.

Cs-TEM: Transmission Electron Microscopy

For TEM observation (JEM-ARM 200F produced by JEOL Co.), NiO on graphene was divided into small pieces after peeling off the same from the substrate, then, dispersed with an acetone solvent on a TEM mesh grid.

XPS; X-Ray Photoelectron Spectroscopy

XPS spectra were obtained using a Sigma Probe from Thermo VG Scientific, which is equipped with a 350 W Al cathode X-ray source along with a multi-cathode, a pulse counting and a hemispherical analyzer. The spectra were collected using an incident photon energy of 1486.6 eV and were corrected for the detector's work function.

TGA; Thermogravimetric Analysis

The weight fraction of NiO on graphene and reNiO on graphene were determined using a TGA (Netzsch, TG 209 F3), as illustrated in FIG. S4.

Raman Spectroscopy

Defect or distortion of the graphene in the electrode is observed by Raman spectra. Raman spectra were obtained using a high resolution dispersive Raman microscope (ARAMIS, HORIBA), which is equipped with Ar ion CW Laser (514.5 nm).

Fourier Transform Infrared Spectroscopy (FT-IR)

Functional groups present in a sample are analyzed using a FT-IR spectroscopy (FT/IR-6100, JASCO).

Analysis of Surface Area and Pore Size $N_2$ adsorption and desorption isotherm curve was determined using a Quadrasorp SI (Quantachrome Instruments).

Inductively Coupled Plasma (ICP) Optical Emission Spectrometry

For further corroborating contents of NiO in a sample, ICP measurement was conducted. The mass concentration of Ni was measured by iCAP 6300 Duo (Thermo Scientific).

Electrochemical Fabrication

Lithium conversion reaction: such reaction was determined by both cyclic voltammetry (CV) and galvanostatic charge/discharge using a Bio-logic VSP potentiostat with a software by EC-lab Bio-logic. The applied apparatus was connected to a coin cell holder. In CV measurement, a voltage ranges from 0.001 to 3.0 V vs. $Li/Li^{2+}$ at a scan rate of 0.1 mV/s. Further, galvanostatic measurement was conducted at a current density of 0.1 A/s (less than C/10).

Ex-Situ TEM and STEM Analysis

Figure 9:
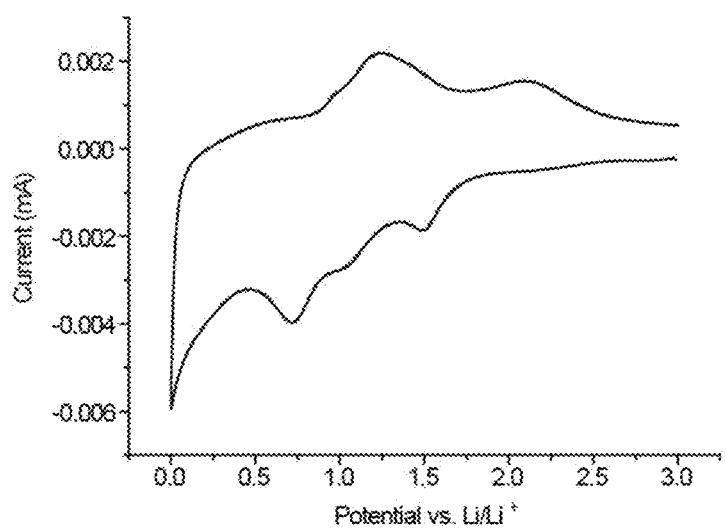
FIG. 9 illustrates CV of a 3 nm NiO on graphene of TEM grid. The reduction and oxidation peaks are slightly shifted by contact resistance between a sample and the grid.

In order to determine a structure of NiO nanoparticles during lithiation-induced rescaling, ex-situ TEM analysis was implemented. A 3 nm NiO on graphene sample was prepared on a TEM grid composed of a C mesh and a lacey carbon support layer, and characterized using Cs-TEM and STEM methods. Also, the initial structure of a specific NiO particle was imaged using both Cs-TEM and STEM methods and its location was marked to trace a structural change after lithiation. The marked grid was assembled into a coin type cell (CR-2032) together with a Li metal foil as a counter electrode, a separator, and the electrolyte. Then, the prepared coin cell was set for potentiostat measurement and also measured using the cyclic voltammetry method at a scan rate of 0.1 mV/s (FIG. 9). Next, after electrochemical measurement, the cell was disassembled and the TEM grid was washed with acetone and water to remove residual electrolyte and Li ions. After washing the grid with water, the grid was used for Cs-TEM analysis and the marked sample was analyzed.

Characteristics of Resealed Graphene/Nickel Oxide (NiO-g) Sample

Figure 11:
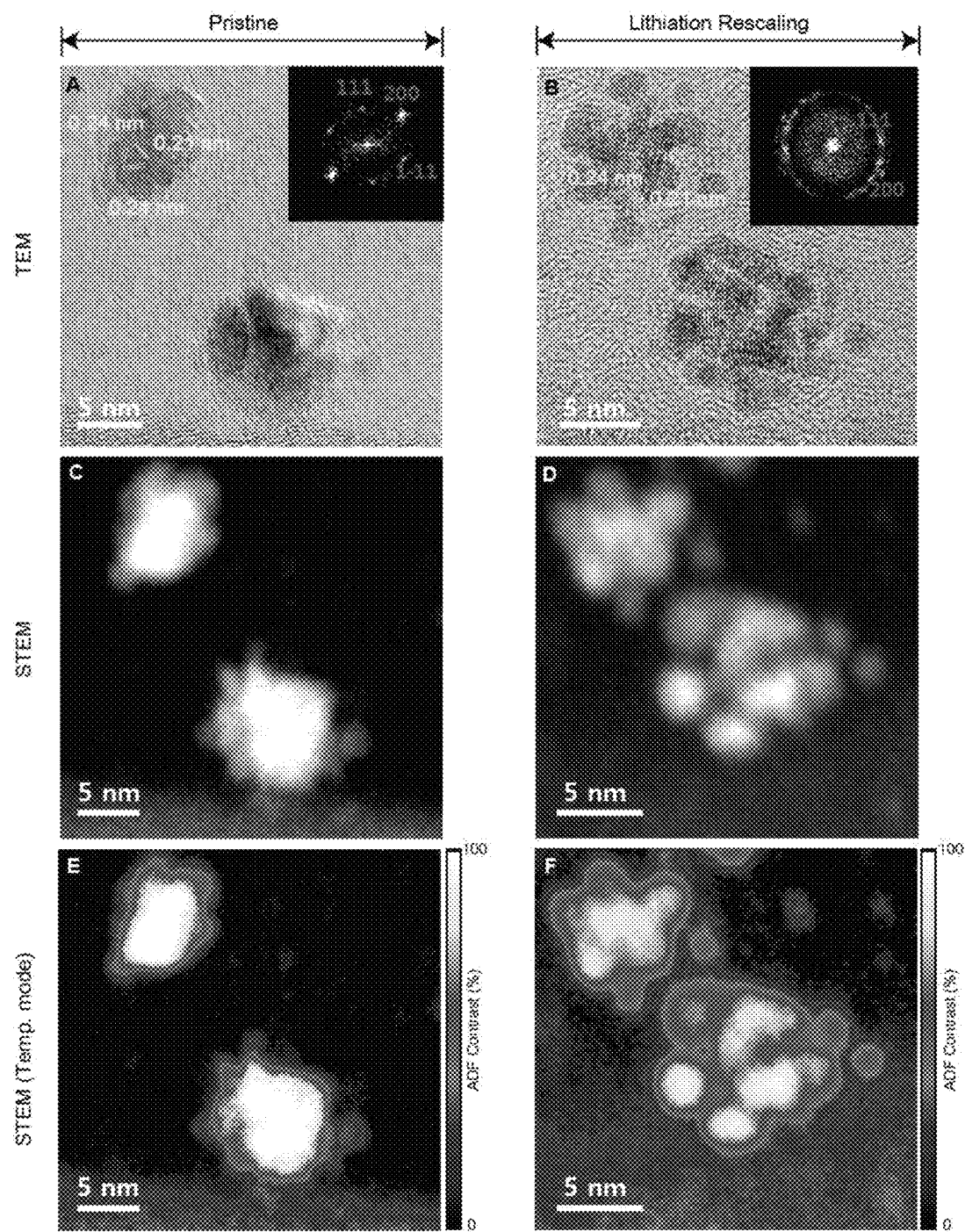
FIG. 11 illustrates Cs-TEM and STEM characterization of 10 nm NiO particles before and after lithiation-induced resealing. (A) and (B) are HRTEM images of 10 nm NiO (A) before and (B) after resealing. Yellow markers show the lattice spacing of NiO nanocrystals. The top right inset shows FFT diffraction pattern obtained from the NiO nanocrystals. (C) and (D) are STEM mapping images of 10 nm NiO (C) before and (D) after resealing (at the same spot determined by TEM). (E) and (F) are STEM mapping images (color scale) of 10 nm NiO (E) before and (F) after resealing (at the same spot determined by TEM)

Lithiation-induced resealing may involve a variety of side reactions or undesired chemical effects in a resealed sample during lithium conversion reaction. Therefore, characterization of resealed NiO-g must be strictly and suitably executed. According to the present invention, in order to analyze NiO structure, chemical bonding of resealed NiO, interaction between NiO and graphene, defects and distortion of graphene, and surface properties of the resealed sample, PXRD, XPS, FT-IR, Raman spectra, and BET measurement were performed. Unfortunately, PXRD has limitation to resolve atomic ordering in particles below 3 nm. For this reason, 10 nm sized NiO-g samples were prepared for further ensuring that even the particles created by resealing could be still available for PXRD analysis. FIG. 11 shows that the 10 nm particles are resealed into 2 to 3 nm particles after reaction and, considering this result, the above approach was successful in easy analysis of the structure of NiO particles after resealing.

Determination of Surface Faradaic Reaction

In order to determine performance of metal oxide nanoparticles undergoing surface faradaic reaction with $OH^-$ ions, a KOH aqueous electrolyte in a three-electrode supercapacitive system was adopted. A platinum coil, a silver/silver chloride electrode in a saturated KCl solution, and a saturated calomel electrode were used as counter, reference 1 and reference 2 electrodes, respectively. A measurement kit contacted the sample to 1M KOH aqueous solution electrolyte and a sample plate was sandwiched between two Teflon cell blocks. Area and intensity of CV peaks indicate the activity and capacity of NiO particles, respectively, in the surface redox reaction,

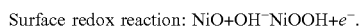

Surface redox reaction: $NiO+OH^-\rightarrow NiOOH+e^-$.

Cyclic Voltammetric Measurement

The capacitive behavior of electrode materials are generally characterized using cyclic voltammetry (CV). For an electrical double layer capacitor, the shape of a CV curve is rectangular. In contrast, for a surface Faradaic reaction, large redox peaks exist. The specific capacitance can be calculated from the area under the CV curve using the following equation:

Herein, m is the mass of active material in the electrode (g), v is the scan rate (V/s), $V_i$ is initial potential (V), $V_f$ is final potential (V) of CV curve, and I is the response current density (A).

Galvanostatic Measurement

The capacitance, the rate capability and the cycle life were all characterized by galvanostatic measurements (equipment: Bio-logic VSP, software: EC-lab Bio-logic). Various current densities were applied to cells while the potential was swept between cut-off values (0V≤V<0.5V). Voltages were recorded at every 0.001 to 0.1 seconds.

Data Analysis

In galvanostatic data, IR drop in top cut-off potential and a slope of the discharged curve (V/s) are used to calculate average power and energy density. The specific capacitance ($C_s$) may be calculated by the following equation. In addition, the mass of active material has been obtained from the weight fraction of active material in the rescaled particles and the graphene support. It should be noted that the total mass of reNiO$_{30}$-g, reNiO$_{50}$-g or reNiO$_{70}$-g electrode was in the range of 1.3 to 1.5 mg/cm$^2$.

$$C_s = I \times \Delta t/(\Delta V \times M),$$

wherein I is the applied current (A), m is mass of active material on electrode (g), the slope is that of the discharged curve after IR drop, and M is total mass of materials on both electrodes. Similarly, energy density (E) is calculated as follows.

$$E = 0.5 CV^2 M$$

Wherein V is cut-off potential voltage excluding IR drop, M is total mass of materials on both electrodes, and C is measured capacitance.

Average power density may be calculated as follows.

$$P = E/\Delta t$$

Wherein E is energy density, and $\Delta t$ is the discharge time after IR drop.

Electrochemical Measurement of a Full Cell Type Asymmetric Supercapacitor

In order to investigate characteristics of the negative electrode, NG as the negative electrode of the full cell prepared beforehand was measured in a three-electrode cell composed of a platinum wire and Ag/AgCl electrode in 1M KOH. CV and galvanostatic measurements were executed using VSP potentiostat. Electrochemical properties of the asymmetric full cell were determined using a two-electrode cell including reNiO-g positive and NG negative electrodes in 1M KOH electrolyte solution. CV and galvanostatic measurements and electrochemical impedance spectroscopy (EIS) were executed using VSP potentiostat. Analysis of results for the full cell was determined on both electrodes with reference to total mass of the samples.

Experimental Conditions for Spectroscopic Measurement

Figure 23:
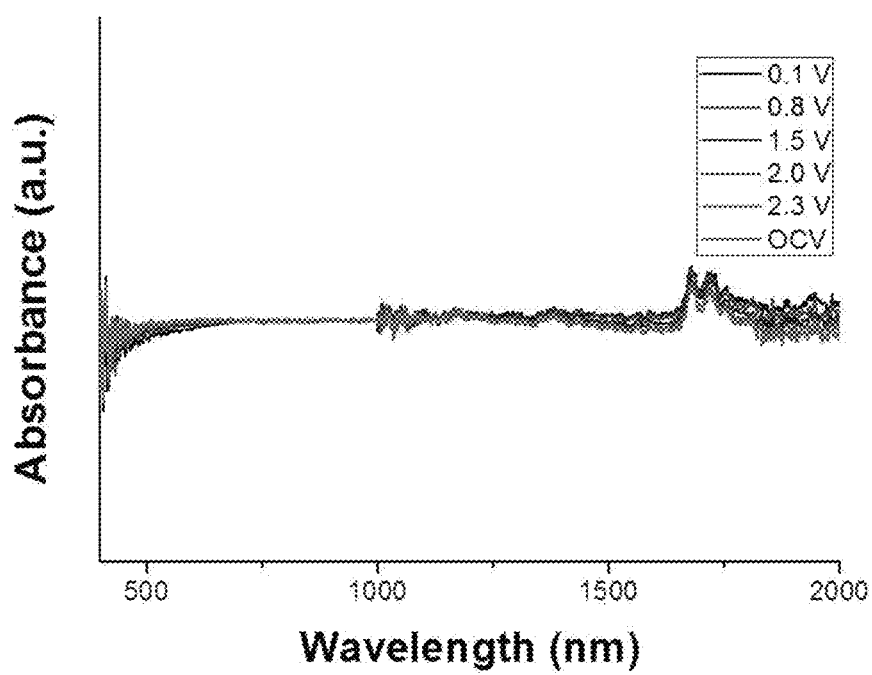
FIG. 23 illustrates UV-Vis spectra of a Au-coated substrate at various potentials vs. Li/Li$^+$. These verify that there is no significant change in Au thin film by lithiation.

Experiments for in-situ and ex-situ spectroscopic measurements, such as SEC and XPS, are conducted by loading the sample on a gold thin film coated glass substrate. A 1 nm thickness Cr thin film was first coated by thermal evaporation (LBNL, Molecular foundry), then, the Au was deposited. The Au-coated thin film substrate is very suitable for spectroscopy during lithium charge/discharge because there is no significant reaction between gold and lithium (FIG. 23).

Ex-Situ XPS Measurement

Ex-situ XPS measurement was conducted at different electrochemical points including the end point of lithiation and delithiation. Obtained data support a variation in Ni oxidation numbers from +2 to 0, and from 0 to +2 by a reversible conversion reaction. After the sample was lithiated on Au-coated glass, the sample was deassembled in a glove box filled with Ar gas, then, washed using dimethyl carbonate and acetonitrile. Thereafter, the sample was transferred to a glass jar completely sealed in the glove box in order to prevent contamination. The Au glass substrate and the lithiated sample are put on the XPS holder and connected to the holder via a screw, in order to minimize charging effects. After measuring the lithiated sample, it was reassembled and subjected to delithiation (recharging to 3 V vs. Li/Li), in order to finish lithiation-induced resealing. A delithiated sample is also measured by the same process used for measurement of the lithiated sample. The sample was maintained in air-free environments except for the exposure of less than 30 seconds to air for transferring and loading the sample on the holder. Further, the XPS spectra were obtained using a Sigma Probe (Thermo VG Scientific) equipped with a 350 W Al cathode x-ray source along with a multi-cathode, a pulse counter, and a hemispherical analyzer. Before incident of a probe beam, the Ar ion sputtering has been executed for 10 sec under 1 keV to remove SEI layer and any contaminant that could result from a side reaction. The spectra were collected using an incident photon energy of 1486.6 eV and were connected for the detector's work function. In addition, all the spectra were corrected to account for charging by shifting their binding energy such that the center of the C is peak lies at 284.5 eV.

In-Situ Spectro-Electrochemistry (SEC)

Figure 24:
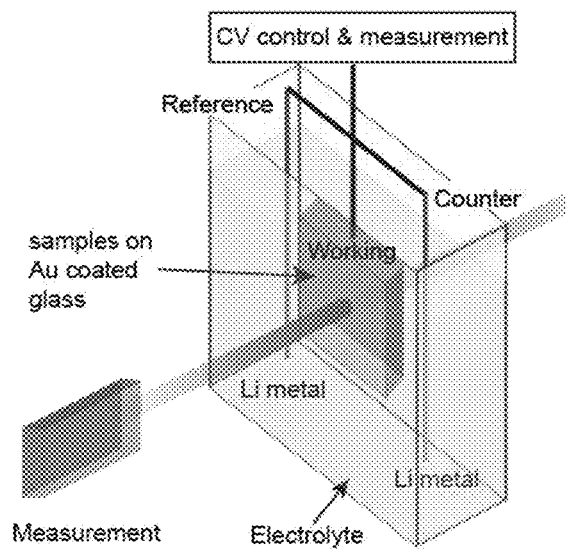
FIG. 24 is a schematic view of a spectro-electrochemistry apparatus.

Transparency of NiO-g in a copper thin substrate enabled precise observation of Ni oxidation number. For combined electrochemical and spectroscopic experiments, the samples were placed in an open quartz cuvette and immersed in a 1M solution of LiPF$_6$ in EC/DEC (1:1 ratio by weight). Lithium metal foils were used as reference and counter electrodes. The sample acting as the working electrode was subjected to cyclic voltammetry measurement at a scan rate of 1 mV/s over a voltage range of 0.1 V to 3 V (FIG. 24). In-situ optical spectra, of which the reference was corrected for the Au-coated glass, were collected at a specific voltage during charge/discharge of the sample. A path length of light in all measurements was about 1 mm. All the spectra were collected using an ASD quality Spec Pro UV-Vis-NIR spectrometer.

Ex-Situ Spectro-Electrochemistry (SEC)

Figure 26:
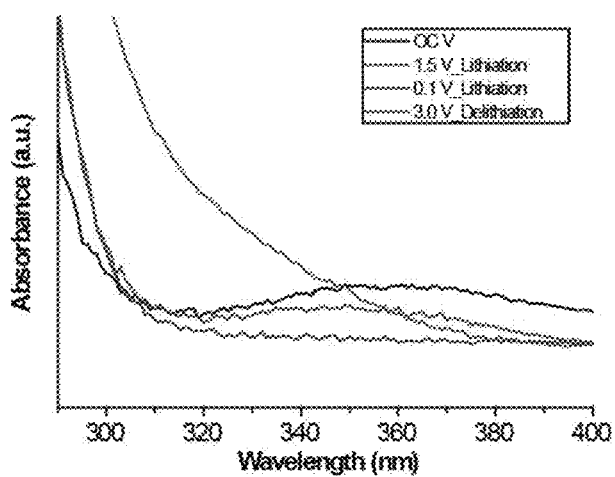
FIG. 26 illustrates UV spectra of pure NiO by ex-situ measurement.

For more precise measurement of a UV region including information of the NiO band gap, UV spectroscopy was used by ex-situ SEC at initial state, middle of lithiation, end of lithiation, middle of delithiation and fully delithiated point (FIG. 26). The sample was transferred to the UV spectroscopic equipment using the same process as described in the case of ex-situ XPS.

Figure 3:
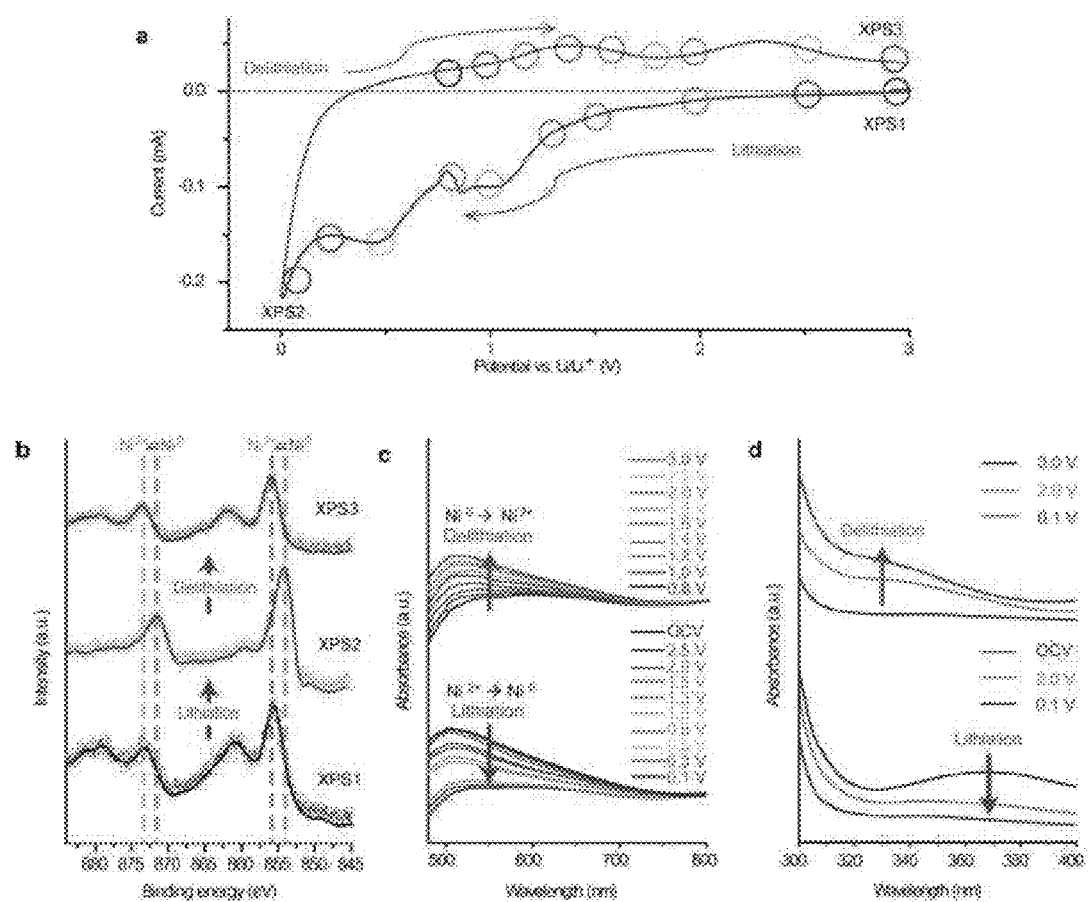
FIG. 3 illustrates a process of resealing involving lithiation ('lithiation resealing') to NiO. Wherein, (a) is cyclic voltammetry indicating measured spots in ex-situ and in-situ spectra, (b) is XPS data of NiO at the beginning, lithiation (discharge) and delithiation (charge) on graphene, with regard to Ni2 $p_{1/2}$ and 2 $p_{3/2}$, (c) is in-situ spectro-electrochemical UV/Vis absorption spectrum during lithium-induced resealing, (d) is UV absorption spectrum at another phase during lithium-induced resealing. The UV/vis absorption spectrum during lithiation (bottom) and UV/vis absorption spectrum during dilithiation (top) were measured at marked positions in (a) illustrating cyclic voltammetric data.

In order to rescale NiO particles (FIG. 1a), a two-electrode device including lithium metal used as the counter/reference electrodes was first assembled, and then, scanned at a scan rate of 0.1 mV/s using CV (Bio-Logic, VSP potentiostat). The cycle with the range of measured voltage of 0.001 to 3 V was repeated, while FIG. 3 demonstrates electrochemical reaction of NiO. Negative peaks around 0.5 V on a graph and positive peaks around 1.3 V and 2.3 V could be clearly observed. After passing a cycle of lithiation and delithiation, the device was separated and a sample (re-NiO-g) including resealed lithium-containing NiO was collected from the electrode. In order to remove the electrolyte, the collected sample was washed with acetone. Finally, the collected reNiO-g was placed in a vacuum oven and dried. As a result of analyzing the sample through dark field scanning TEM (STEM), it was ascertained that NiO nanocrystals were on the scale of the atomic units, as illustrated in FIGS. 1b and 1c.

In order to ascertain 3 nm NiO single particles obtained by resealing, the present inventors implemented ex-situ TEM analysis (FIGS. 1d and 1e, and FIGS. 9 and 10). In order to exactly ascertain a change before and after the cycle, a change at the exactly same location of TEM grid was monitored. The TEM image and inset figure in FIG. 1d exhibit lattice spacing and NiO crystals before resealing in Fourier transformation pattern along with 3 nm NiO single crystals. Also, after lithiation-induced resealing, no lattice or diffraction pattern was monitored (FIG. 1e). In order to clearly ascertain reNiO particles, STEM mapping images in a temperature mode were obtained (FIGS. 10c and 10d), and it could be found that bright colored spots convinced as atomic unit scale reNiO particles are present on graphene.

The present inventors have evaluated energy storage characteristic of reNiO-g in an aqueous electrolyte containing hydroxyl ions (OH$^-$) by galvanostatic measurement, as illustrated in FIGS. 1d and 1e. reNiO-g exhibited high capacitance (2,231 F/g$_{total\ composite}$ within 0.5 V) increased by 6 times, compared to before resealing of NiO (350 F/g$_{total\ composite}$). The hydroxyl ions in the aqueous electrolyte indicate that these contact with whole NiO particles resealed through faradaic reaction (NiO+OH$^-$NiOOH+e$^-$).

Figure 10:
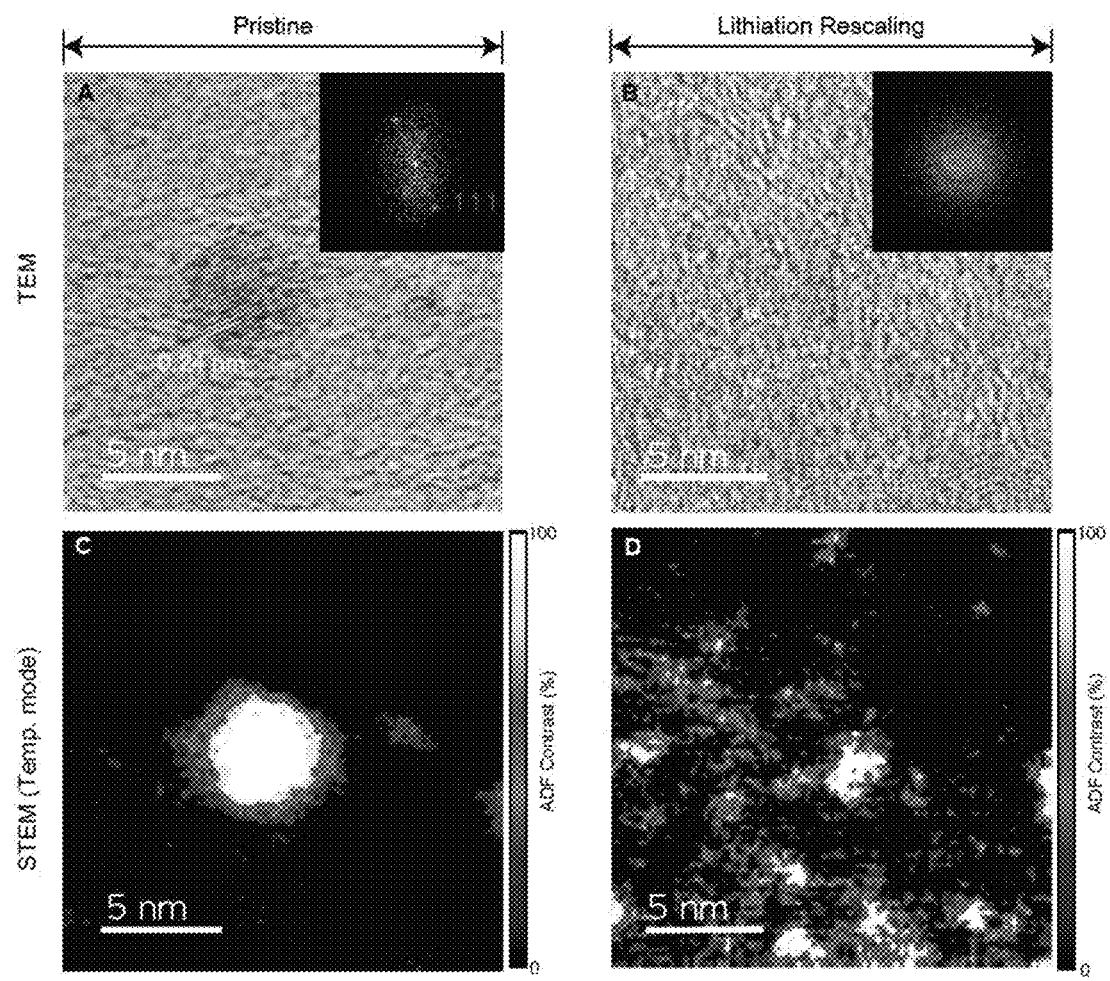
FIG. 10 illustrates Cs-TEM and STEM characterization of 10 nm NiO particles before and after lithiation-induced resealing. (A) and (B) are HR-TEM images of 10 nm NiO (A) before and (B) after resealing. Yellow markers show the lattice spacing of NiO nanocrystals. The top right inset shows FFT diffraction pattern obtained from the NiO nanocrystals. (C) and (D) are STEM mapping images of 10 nm NiO (C) before and (D) after resealing (at the same spot determined by TEM)
Figure 12:
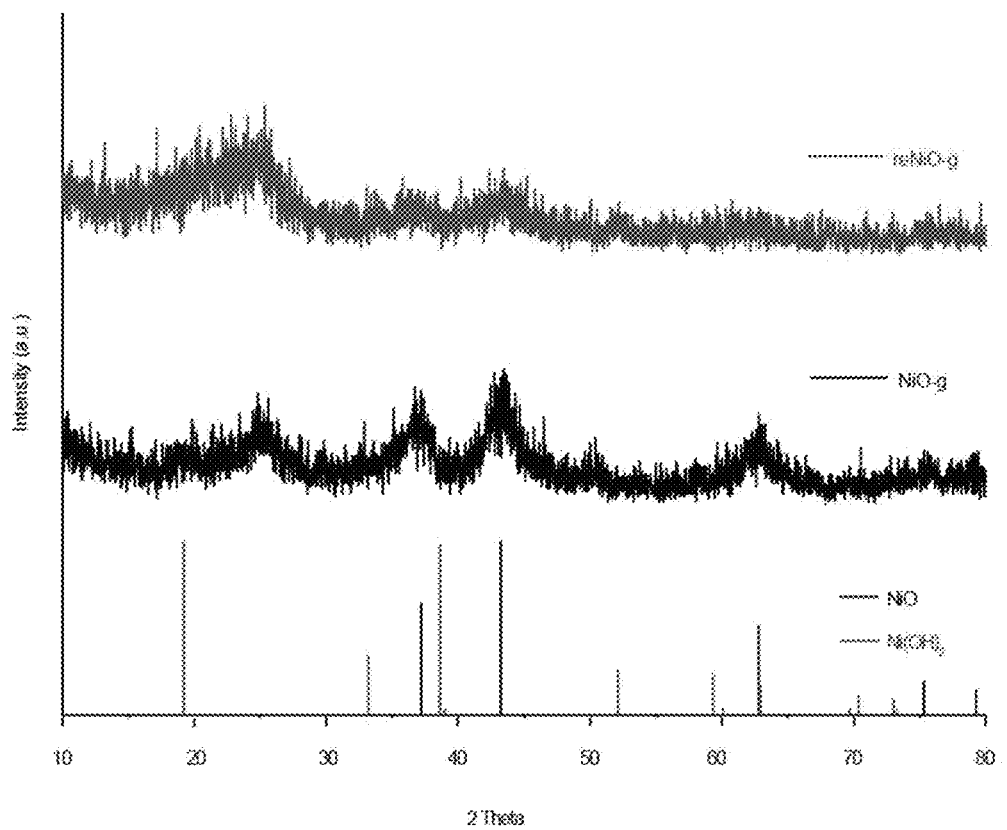
FIG. 12 illustrates PXRD data of 10 nm NiO-g and resealed NiO-g. The diffraction pattern of NiO-g (black line) is well matched with the standard NiO diffraction pattern (JPCD number 71 to 1179). After resealing, the NiO structure remains, although it is broadened due to reduced size. Peaks at around 25 may refer to peaks of graphitic carbon.
Figure 13:
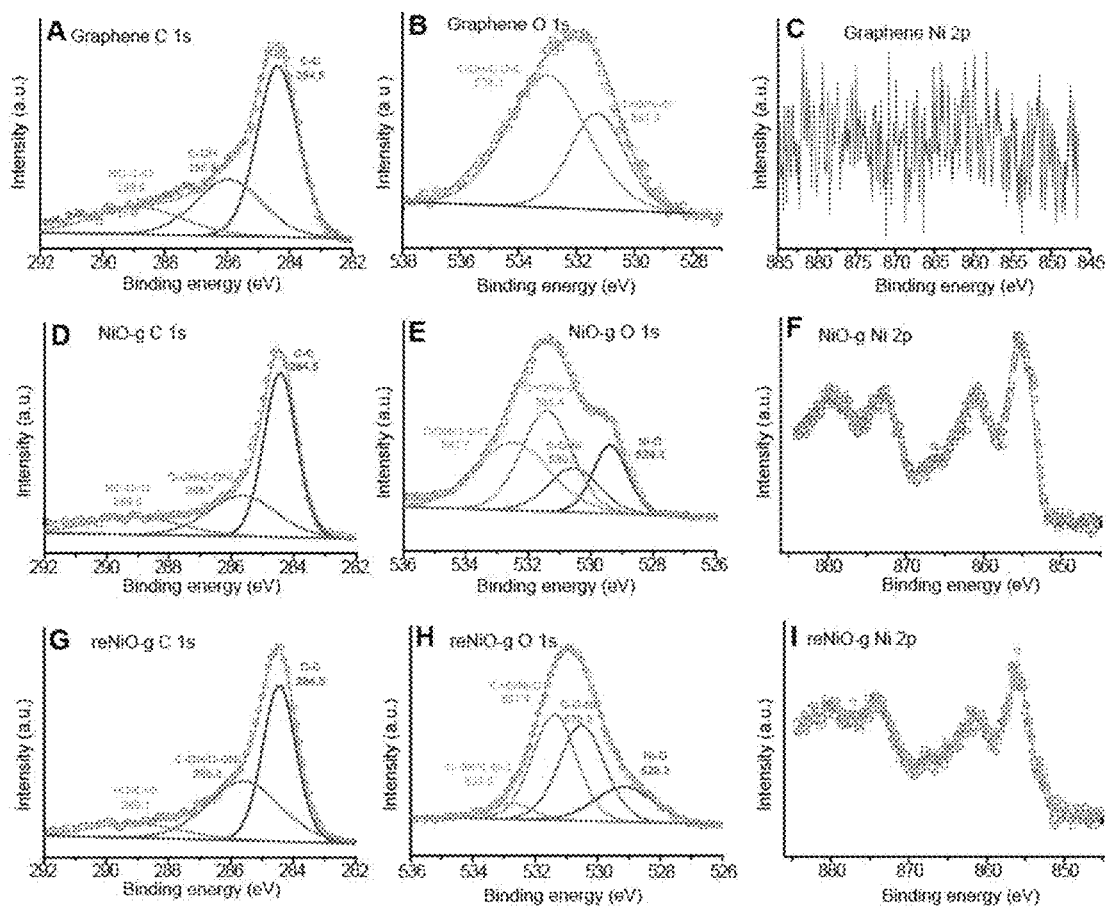
FIG. 13 illustrates XPS spectra of graphene, NiO-g and reNiO-g. (A) C 1s, (B) O 1s, and (C) N 2p spectra of graphene. (D) C 1s, (E) O 1s, and (F) Ni 2p spectra of NiO-g. (G) C 1s, (H) O 1s, and (I) Ni 2p spectra of reNiO-g. Comparing O 1s spectra, the C—O—Ni linkage between NiO and graphene is increased after resealing. These results suggest that the resealed NiO particles are linked on the oxidized graphene without transformation into Ni(OH)
Figure 14:
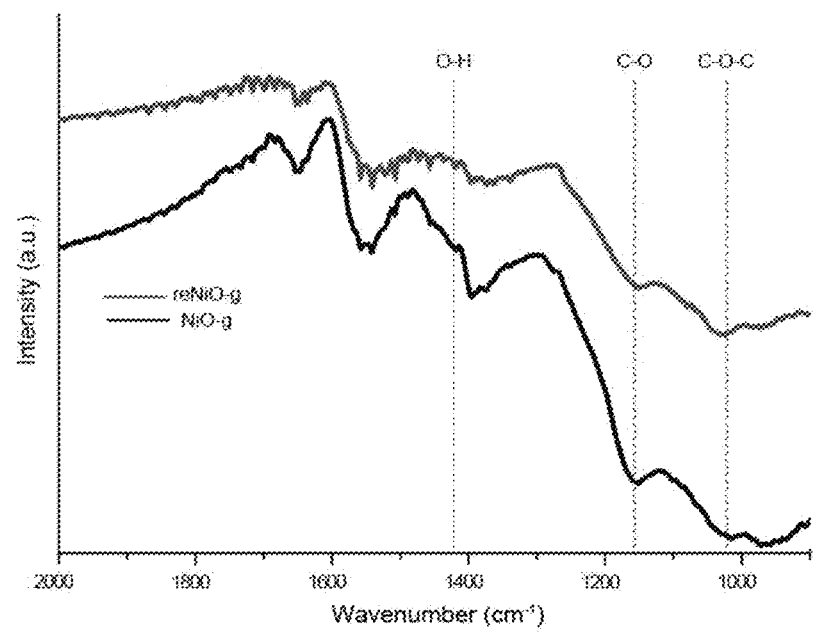
FIG. 14 illustrates FTIR spectra of NiO-g and resealed NiO-g. The binding between the graphene and NiO particles was analyzed by FTIR. Characteristic peaks for the graphene at 1421, 1162 and 1025 $cm^{-1}$ are attributed to O—H and C—O vibration modes of C—OH groups, and C—O—C vibration mode of epoxy groups. Intensities of such peaks at 1421, 1162 and 1025 $cm^{-1}$ are decreased after resealing, thus demonstrating that residual oxygen containing groups on the graphene in NiO-g are broken and form additional C—O—Ni bonds during the resealing process. An absorption band appears at 1561 $cm^{-1}$, which is attributed to skeletal vibration of the graphene sheets. Also, the absorption band at 1650 $cm^{-1}$ is assigned to a bending vibration mode of O—H groups from absorbed water molecules.
Figure 15:
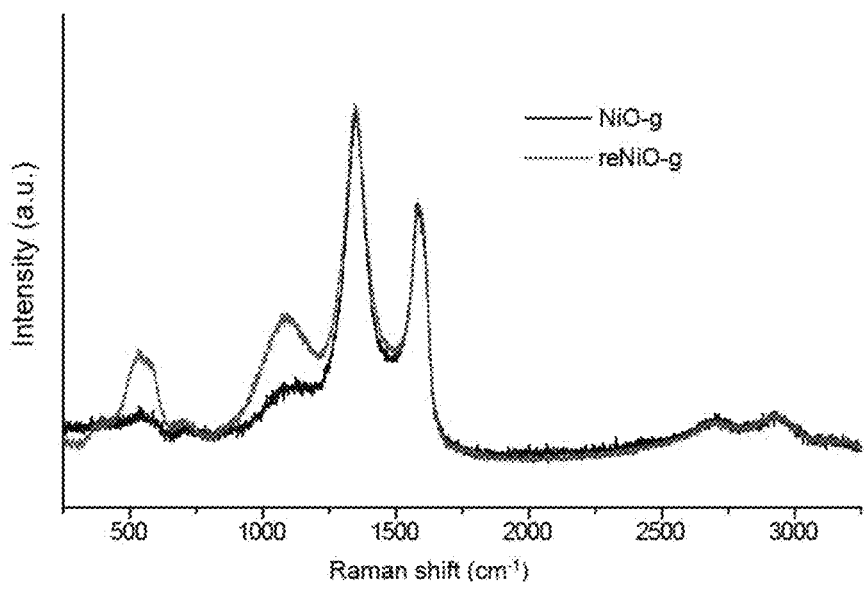
Figure 16:
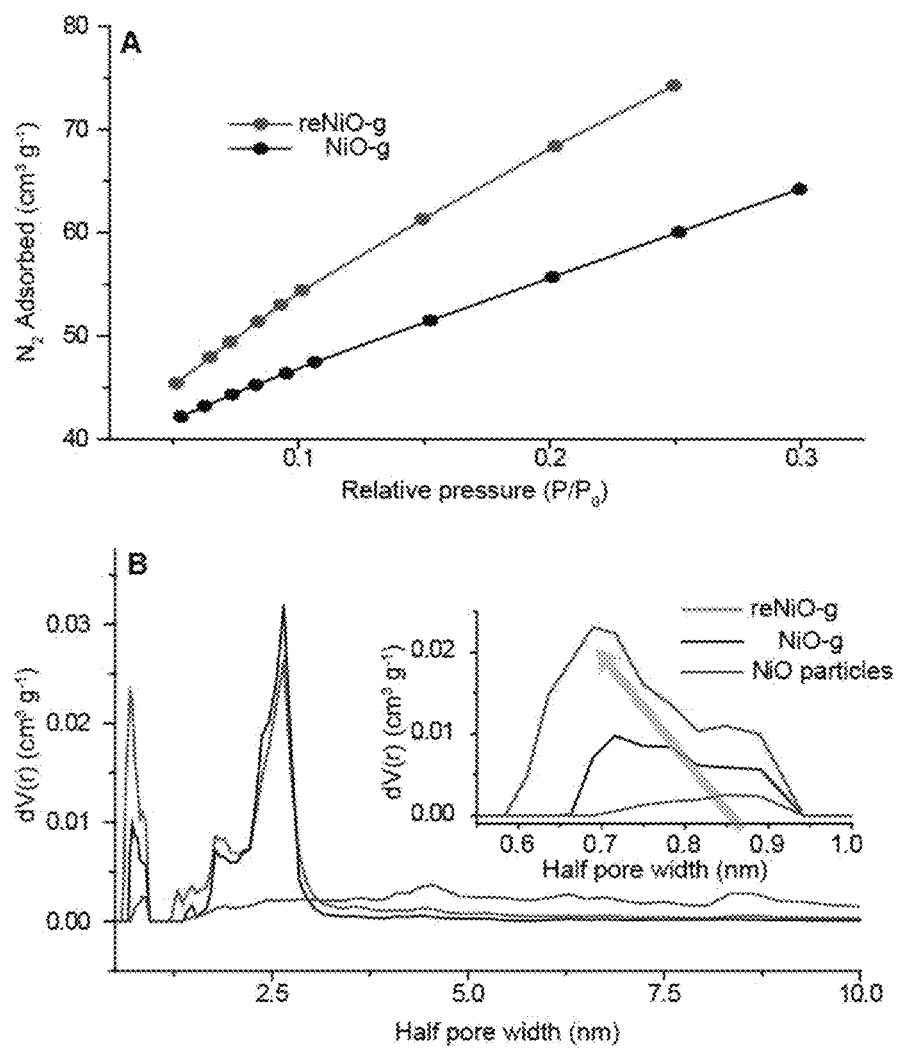
FIG. 16 illustrates $N_2$ adsorption/desorption measurement of NiO-g and reNiO-g. (A) shows $N_2$ adsorption of NiO-g and reNiO-g in a linear section. BET surface areas of NiO-g and reNiO-g are 260 $m^2/g$ and 335 $m^2/g$, respectively. Small particles created on graphene by resealing result in an increase in the surface area. (B) shows pore size distributions of NiO particles in NiO-g and reNiO-g by NLDFT method. Peaks at around 2.5 nm originate from the graphene interlayer of NiO-g, and reNiO-g is not changed significantly. On the other hand, pores with less than 1 nm size are increased after resealing (see inset figure).

The present inventors have proved in ex-situ TEM and STEM images of single molecules that lithiation-induced rebinding described above is suitable for 10 nm nanoparticles. It was found that 10 nm NiO nanoparticles are resealed into 2 to 3 nm size while resealing of 3 nm particles on the scale of atomic units (FIG. 10). Moreover, ex-situ XRD measurement of 10 nm NiO-g before and after resealing support that reNiO particles maintain crystallinity, while the size of the same is reduced (FIG. 12). X-ray photoelectron spectroscopy (XPS) and Fourier transform infrared spectroscopy (FT-IR) spectra (FIGS. 13 and 14) provide information on binding to graphene before and after NiO resealing. From O1s XPS spectra and FT-IR spectra showing oxygen-containing groups, an increase in C—O—Ni linkage between graphene and NiO after resealing could be seen. However, Raman spectroscopy demonstrates that defect or distortion of the graphene sheet does not occur in the resealing process (FIG. 15). Results of XPS, FT-IR and Raman spectra described above strongly support that the structure of graphene can maintain its morphology with no influence of the resealing. Further, resealed particles along the N$_2$ adsorption and desorption isotherm curve (FIG. 16) have a surface area of 335 m$^2$/g and, after resealing, the surface area was increased by about 129%.

Figure 17:
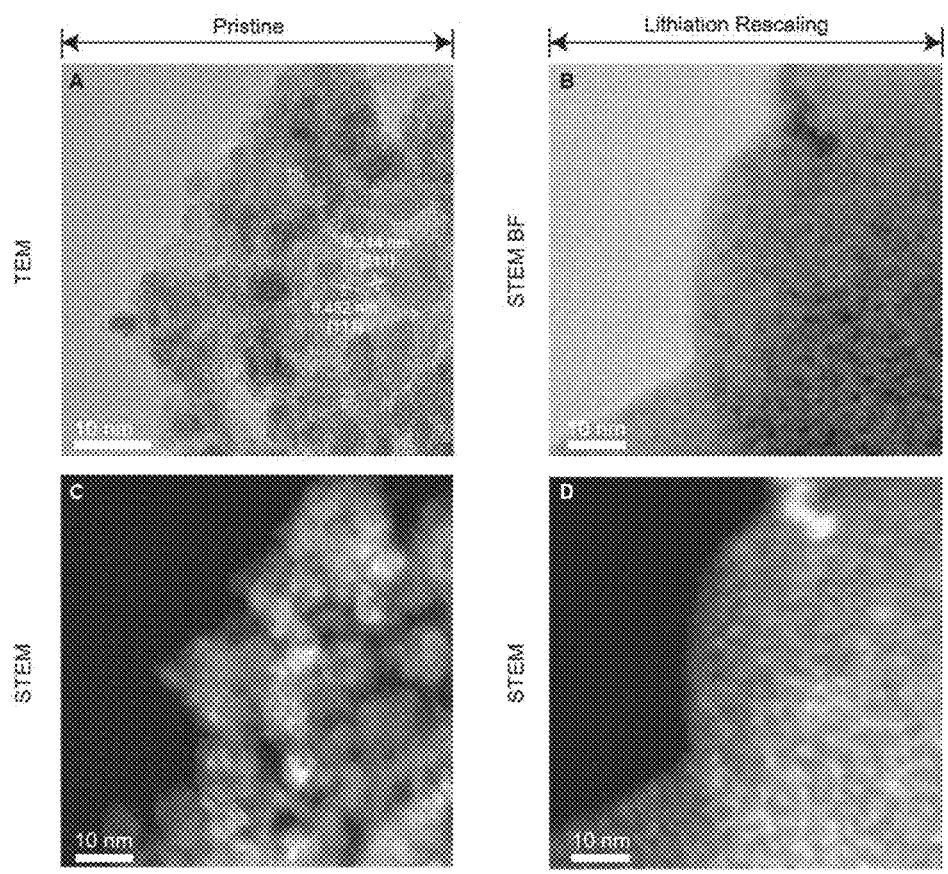
FIG. 17 illustrates TEM & STEM characterization of cobalt oxide ($Co_3O_4$) particles before and after lithiation-induced resealing. (A) is HR-TEM image of $Co_3O_4$ particles before resealing. Yellow markers show the lattice spacing of Co$_3$O$_4$ nanocrystals. (B) is Bright Field (BF)-TEM image of lithiation-rescaled Co$_3$O$_4$ particles. (C) and (D) are high angle annular dark field (HAADF) STEM mapping images of Co$_3$O$_4$ particles (C) before and (D) after resealing (at the same spot determined by TEM)

The inventors applied the same resealing experiment to Co$_3$O$_4$, with a size of several nanometers and found that the cobalt oxide is also on the scale of the atomic units (FIG. 17). Accordingly, it can be understood that the lithium-applied resealing can easily control metal oxide atomic unit scale particles, and may be used as a very general method. Other than Co, Mn, Ti, Sn oxides have also undergone the same experiments and proved to be resealed.

Lithiation possible metals may include any of transition metal oxides and, among these, for example, may be at least one selected from RuO$_2$, IrO$_2$, MnO$_2$, Mn$_3$O$_4$, Co$_3$O$_4$, NiCo$_2$O$_4$, V$_2$O$_5$, SnO$_2$, TiO$_2$, MoO$_3$ and Fe$_2$O$_3$.

Figure 2:
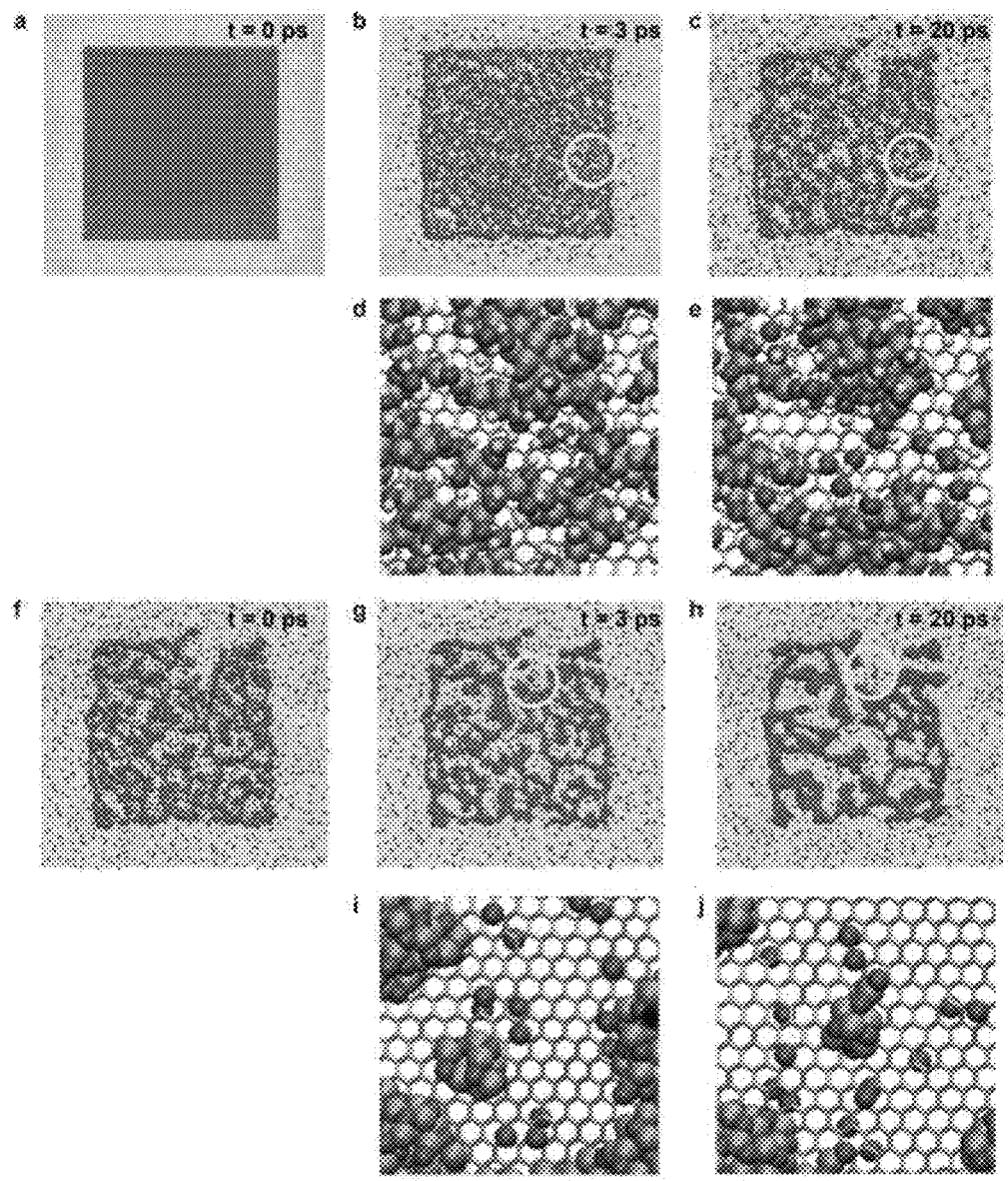
FIG. 2 is snapshots for lithiation/delithiation in lithium+ NiO+graphene, and illustrates the delithiation process in NYT simulation under more than 20 ps at 3000K. Wherein, a, b and c are snapshots at (a) t=0 ps, (b) t=3.0 ps and (c) t=20 ps, respectively, during lithiation and delithiation; d and e are enlarged views of yellow colored parts in 'b' and 'c', respectively, to minutely illustrate a cluster structure based on the scale of the atomic units; f, g and h are snapshots at (f)=0 ps, (g) t=3.0 ps and (h) t=20 ps, respectively, during delithiation; and i and j are views of yellow colored portions in 'g' and 'h', respectively, with being enlarged to minutely illustrate a cluster structure based on the scale of the atomic units, and being divided a stimulation process into subsections. Arrangement at starting begins from a lithiation process (e) since whole lithium was removed. C has a silver color, Ni shows silver blue, and O is red.
Figure 6:
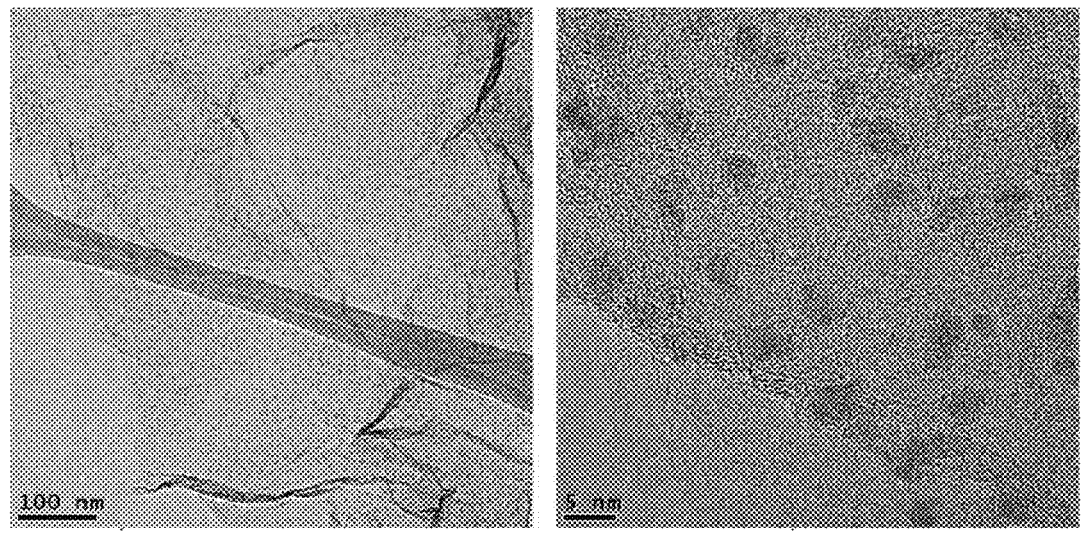
Figure 7:
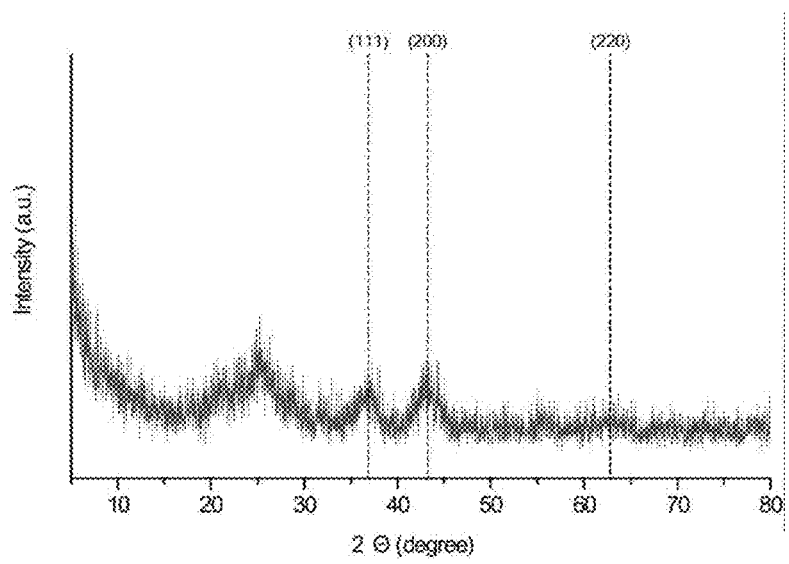
Figure 8:
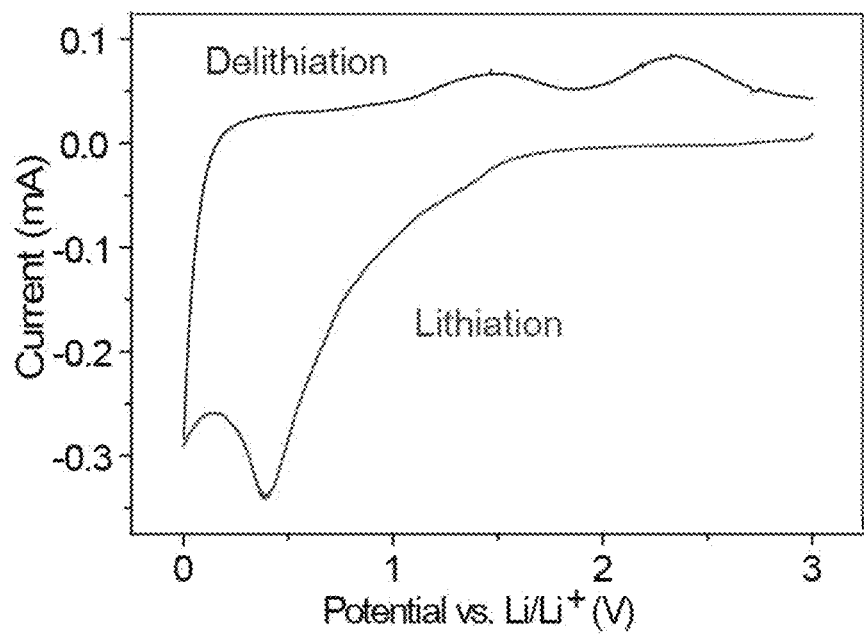
FIG. 8 is voltage profile of graphene/NiO at first cycle under lithiation resealing. Plateaus located at around 0.5 V and at 1.3 V and 2.3 V in a discharge curve, respectively, illustrate reduction and oxidation peaks.
Figure 18:
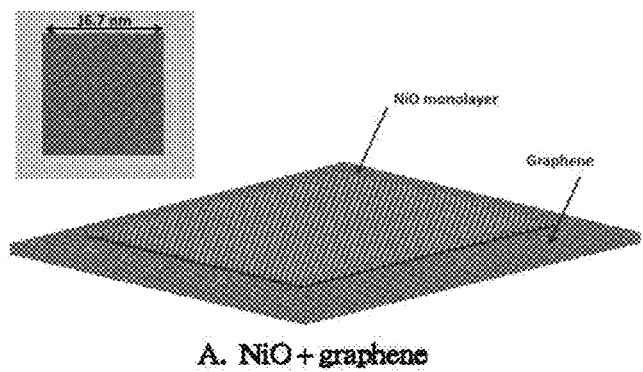
FIG. 18 illustrates an initial structure according to molecular dynamic simulation to compare effects of Li on NiO nanostructure on graphene surface. (A) shows NiO monolayer on top of a graphene sheet. Herein, the NiO monolayer was built from experimental crystal structure (100) surface of Fm3m. A length in x and y dimensions is 16.7 nm, which consists of 3,280 NiO. The same number of atoms in a NiO nanosphere would have a diameter of 3.0 nm. The dimension of the graphene sheet is 24.6×22.9 nm which consists of 21,600 C atoms. A total system consists of 28,160 atoms. (B) shows Li double layers and NiO monolayer on top of the graphene sheet. The Li double layers have 6,560 Li atoms in order to achieve 2:1 ratio relative to O. The other parts are the same as a case of NiO+graphene. Colors are: C in silver, Ni in silver blue, and O in red.
Figure 18:
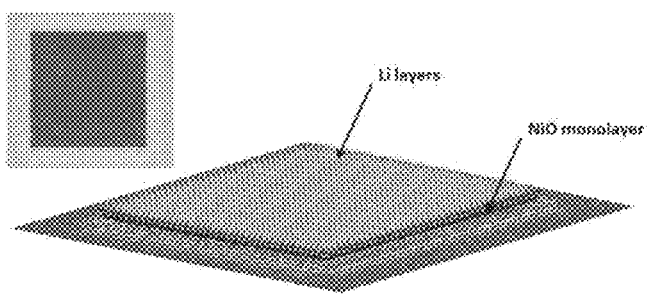
Figure 19:
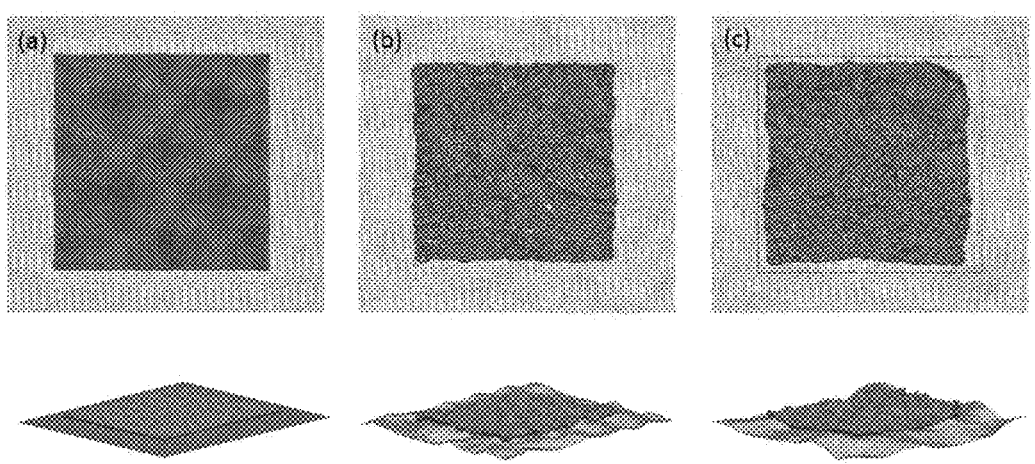
FIG. 19 illustrates snapshots of NiO+graphene during 20 NVT simulation at 300 K. The top figure shows top view while the bottom figure shows side view. (A) t=0 ps, (B) t=3.0 ps, and (C) t=20 ps. A red rectangle labeled in (C) is an original area of NiO Layer. Colors are: C in silver, Ni in silver blue and O in red.

The ReaFF reactive molecular dynamics (RMD) simulation was executed to obtain a hint for a mechanism for atoms with electrochemical variations. Electrons were obtained by an electronegativity equalization method. Parameters of ReaxFF were optimized to be well matched with Mulliken populations and to enable partial covalency. In order to investigate the shape of NiO nano-cluster present on the raphene sheet, simulation started from NiO monolayer (FIGS. 18 and 19). When the simulation reached 300K, a boundary of the NiO monolayer began to be folded. When the time was sufficient without lithium, the above simulation experimentally demonstrated that 3,280 NiO were used and the particle size was 3 nm (FIGS. 6 and 7). FIG. 2 showed RMD simulation of NiO resealing after lithium application, wherein, unlike pure NiO, NiO monolayer did not agglomerate but was separated. Such separation resulted in a clear boundary. FIGS. 2d and 2e showed enlargement of the selected area and minutely showed atoms in the structure. Nucleus of the metal nickel and OLi$_x$ shell were found at the peripheral side. All lithium atoms were boned to oxygen at the outside, however, the small cluster was positive and helpful for separation and formation of cluster based on the scale of the atomic units. The image of the resultant structure (FIG. 2c) demonstrated that this is associated with experimental results (FIG. 10) of STEM image. During the simulation, Li$_2$O occasionally linked to the graphene sheet was also observed. Further, in order to simulate delithiation, all Li were removed then the simulation was executed. FIGS. 2i and 2j were snapshots of 20 ps during the simulation. These snapshots showed diffusion of atoms, oxygen and nickel after removal of Li. Herein, oxygen atoms firstly reacted with lithium, and then, immediately oxidized nickel into Ni$^{2+}$ in the form of NiO.

Figure 20:
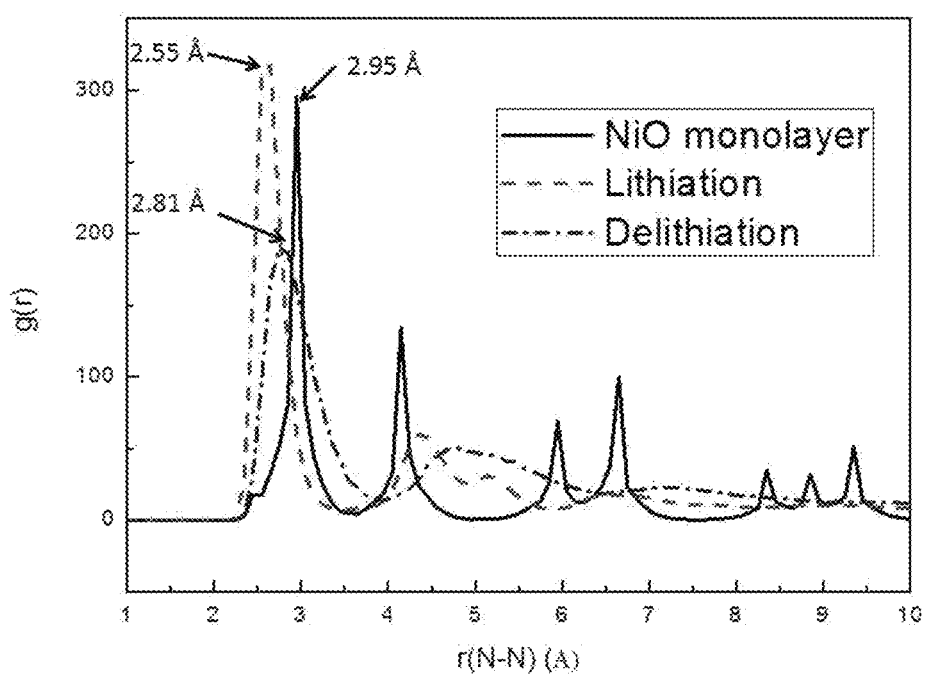
FIG. 20 illustrates comparison for radial distribution functions of $g_{Ni-Ni}(r)$ as a function of Ni—Ni distance between first case of having a NiO monolayer as an initial structure and second case of starting with a Ni layer on top of NiO. An experimental Ni—Ni distance is 2.440 Å in Ni metal (fcc) and 2.954 Å in NiO crystal (Fm3m), respectively. Herein, the black solid line shows a radial distribution for the NiO monolayer, the red slashed line shows one for lithiation, and the blue dot slashed line is one for delithiation.

Ni—Ni radial distribution function (rdf) (FIG. 20) concretely illustrates natural nickel. At the beginning of lithiation simulation, a distance between Ni—Ni in NiO crystalline phase (B1 or NaCl structure) was the nearest value, 2.95, at which the strong peak can be seen in rdf. After 20 ps simulation, it was found that Ni—Ni rdf had peaks at 2.55 Å near to 2.44 Å for Ni metal peak. Nickel atoms in the middle of each cluster are present in Ni$^0$ state and this fact is verified by XPS data demonstrating that Ni is changed from Ni$^{2-}$ to Ni$^0$ during lithiation. In addition, it was found that such atomic unit is maintained when the cluster returns to nickel oxide state while removing lithium in a Ni:LiO$_x$ core-shell structure. Similarly, Ni—Ni rdf peak also returned to 2.81 after delithiation and this was coincident with experimental results for a change of Ni$^0$ to Ni$^{2+}$. In the simulation, all of Ni—Ni intervals in NiO did not return to 2.95. This fact may be considered because a 20 ps simulation time was not enough to completely oxidize NiO into NiO molecules, but some of oxygen atoms were still adsorbed to the graphene sheet. However, it may be anticipated that nickel may be completely oxidized if the simulation time unit is sufficiently extended.

Figure 21:
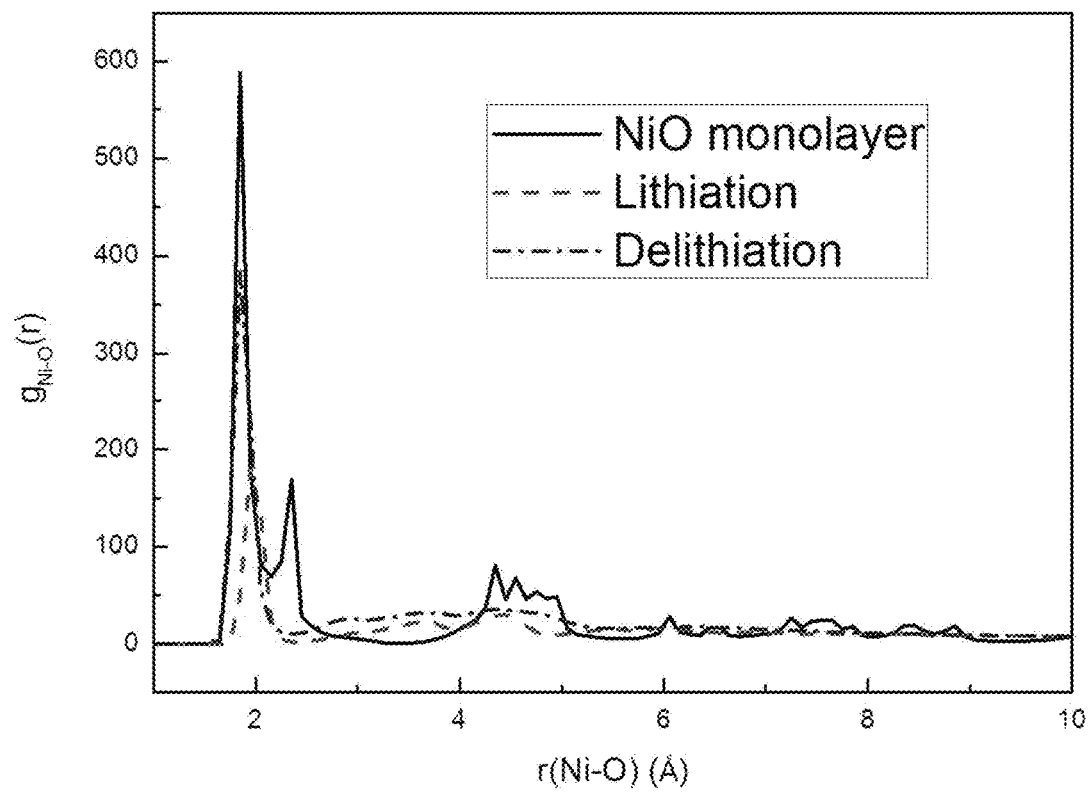
FIG. 21 illustrates comparison for radial distribution functions of $g_{Ni-O}(r)$ as a function of Ni—O distance among initial structure (NiO monolayer), structure after lithiation, and structure after delithiation, which was shown in black solid line, red slashed line and blue dot slashed line, respectively. The $g_{Ni-O}(r)$ of NiO monolayer exhibits strong first peak around 600, which would decrease to 200 then shift to longer distance. This indicates that Li reduces Ni, which in turns, decreases the coordination number of O around Ni. After delithiation, the peak goes back 400, indicating that Ni particles are oxidized again.

Further, simulation (FIG. 21) demonstrated that lithiation decreases nickel and also decreases the number of oxygen around the nickel. After delithiation, nickel is further oxidized. Meanwhile, each nickel in NiO crystal is adjacent to four oxygen atoms and four nickel atoms, while NiO itself is adjacent to 3.89 oxygen atoms and 4.03 nickel atoms. After lithiation, each nickel is adjacent to average 1.22 oxygen atoms and 6.75 nickel atoms. After delithiation, NiO returns again to the original level of 2.88 oxygen atoms and 3.71 nickel atoms. FIG. 22 illustrates RMDs of NiO (black), RMDs of NiOLi$_2$ (green), and RMDs of delithiated NiOLi$_2$ (red). In addition, RMDs of Ni and Li are further illustrated in FIGS. 22b and 22c. The above results explain reverse change of nickel from divalent atom charges at lithiation to zero-valent atom charges at delithiation.

In order to experimentally characterize the mechanism of lithium-applied rescaling, cyclic voltammetry (CV) measurement of a half electrode was introduced, and XPS and spectro-electrochemical methods were used in ex-situ and in-situ states, respectively. In particular, a device was made of lithium metal as counter/reference electrodes and NiO-g applied to Au-coated glass as a working electrode. Such Au thin film was not influenced by charging/discharging lithium (FIG. 23). CV characteristics of NiO-g sample were determined at a scan rate of 0.1 mV/s (FIG. 3a). In the discharging process (lithiation), NiO peaks were shown at 0.5 V and 1.0 V to demonstrate occurrence of a reaction, NiO+2Li$^+$+2e$^-$Ni:Li$_2$O. Also, two types of peaks were shown at 1.3 V and 2.3 V in the charging process (delithiation). These electrochemical data was verified in ex-situ XPS and in-situ optical spectra, and also could be convinced by chemical phase variation of nickel. Ni 2p spectra in XPS1 and XPS2 demonstrated (FIG. 3a) that, after lithiation, Ni$^{2+}$ is decreased to 852.8 eV as a lower binding energy of 2p$_{3/2}$, thus being substantially coincident with $Ni^0$ redox state. According to XPS3 in FIG. 3a, it can be seen that Ni 2p spectrum increases again to a higher binding energy at the end of the cycle, thus indicating that $Ni^0$ returns to $Ni^{2+}$ again. According to the above results, redox reaction of nickel oxide particles may reversely exist.

Figure 25:
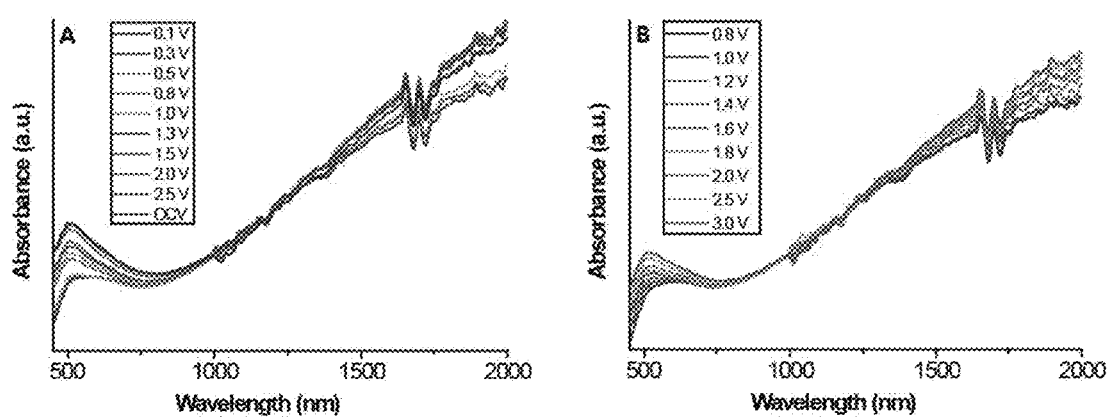
FIG. 25 illustrates SEC data of NiO on graphene in full spectral region. (A) is data at lithiation and (B) is data at delithiation.

The present inventors also identified an electrochemical resealing process by in-situ spectro-electrochemical UV/Vis measurement (FIGS. 24 and 25). This measurement is a significant experimental result to ascertain possibility of a change in sample during ex-situ analysis. Optical spectra appear in the form of spots then are shown as a circle having color, as illustrated in FIG. 4a. While discharge proceeds in the first step of the resealing process, adsorption occurred by d-d transition property of $Ni^{2+}$ (around 550 nm) is gradually weakened and such change turns up a gradual decrease in divalent Ni state, which in turns, becomes to zero-value Ni state (FIG. 3c). Ex-situ UV transmittance (FIG. 3d, bottom) shows that band-gap adsorption peaks of NiO (370 nm) disappeared in the above process. When a reverse reaction occurs during charging, d-d transition peaks and band-gap adsorption peaks of NiO appear again (FIG. 3c). However, the band-gap adsorption peaks are widely spread to cause blue-shift (FIG. 3d, top). UV absorption band of NiO particles without graphene also causes blue shift similar to the above (FIG. 26). Therefore, although the reaction of NiO containing Li may act reversely, the morphology of NiO is dramatically varied. As shown in the significant blue-shifted band-gap, NiO particles are further decreased. Accordingly, such optical changes as described above support the results shown in TEM and STEM images of the electrochemical process wherein original particles are converted into atomic unit scale NiO (FIGS. 1 and 10).

Figure 27:
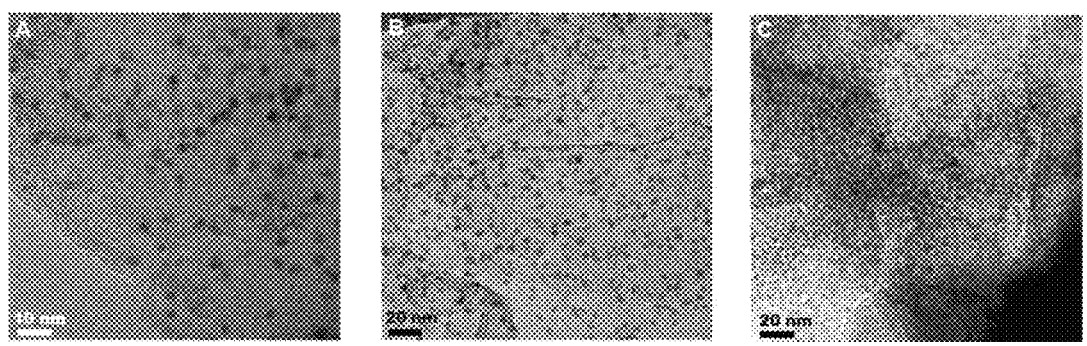
FIG. 27 illustrates TEM images of NiO on graphene with 30, 50 and 70 wt. % NiO contents. (A) NiO$_{30}$-g, (B) NiO$_{50}$-g, (C) NiO$_{70}$-g.
Figure 28:
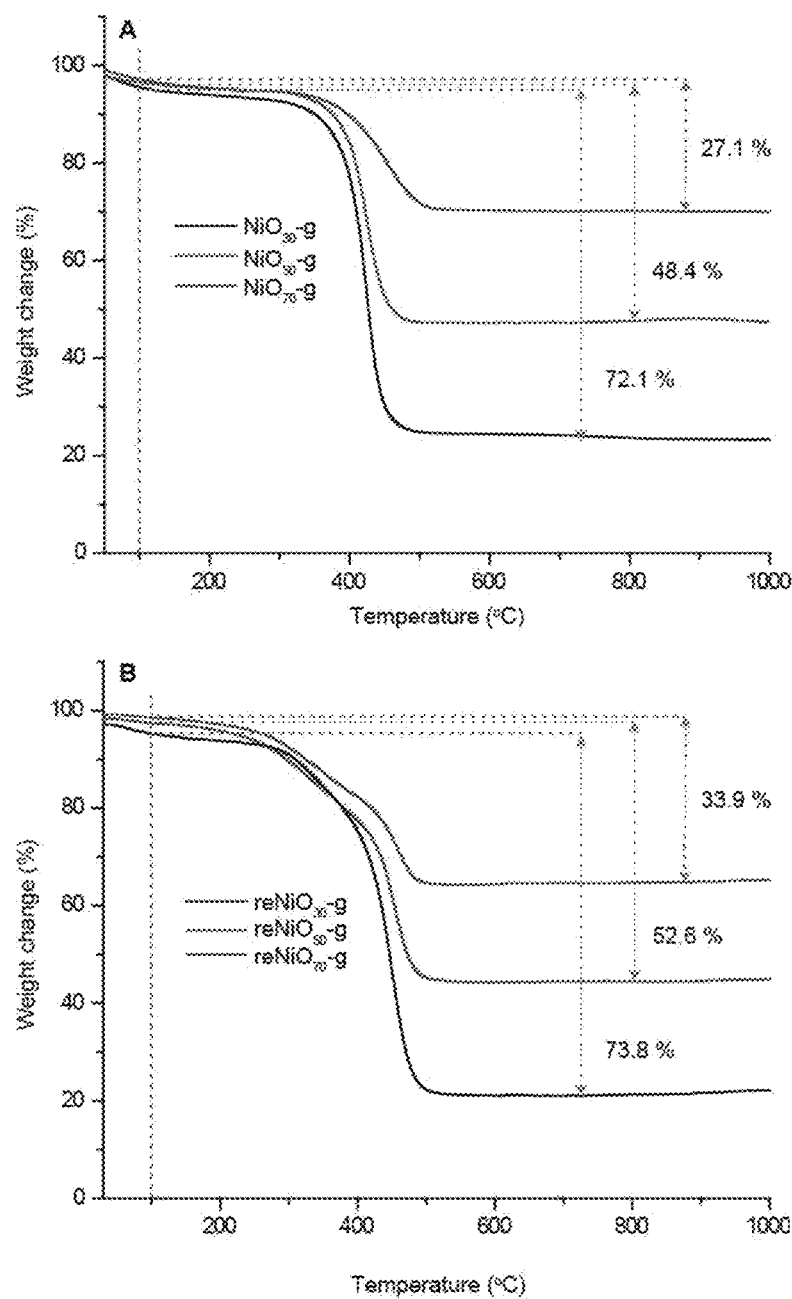
FIG. 28 illustrates thermogravimetric analysis (TGV) measurements for various NiO loadings of (A) NiO-g and (B) resealed NiO-g. In particular, (A) shows that an apparent large weight loss can be observed at around 500° C., and a total amount of graphene presented in NiO$_{30}$-g, NiO$_{50}$-g and NiO$_{70}$-g are measured to be 72.1%, 51.3%, and 27.1%, respectively. (B) shows that, after the resealing process, the graphene contents in reNiO$_{30}$-g, NiO$_{50}$-g and NiO$_{70}$-g were determined to be 73.8 wt. %, 54.2 wt. %, and 33.9 wt. %, respectively. The weight loss of around 2.5 to 5% below 100° C. is likely due to evaporation of absorbed moisture, which is common for materials with a large surface area. Additional plateau present at around 300 to 400° C. in TGA data of resealed samples is considered to originate from residual PVDF binder.
Figure 29:
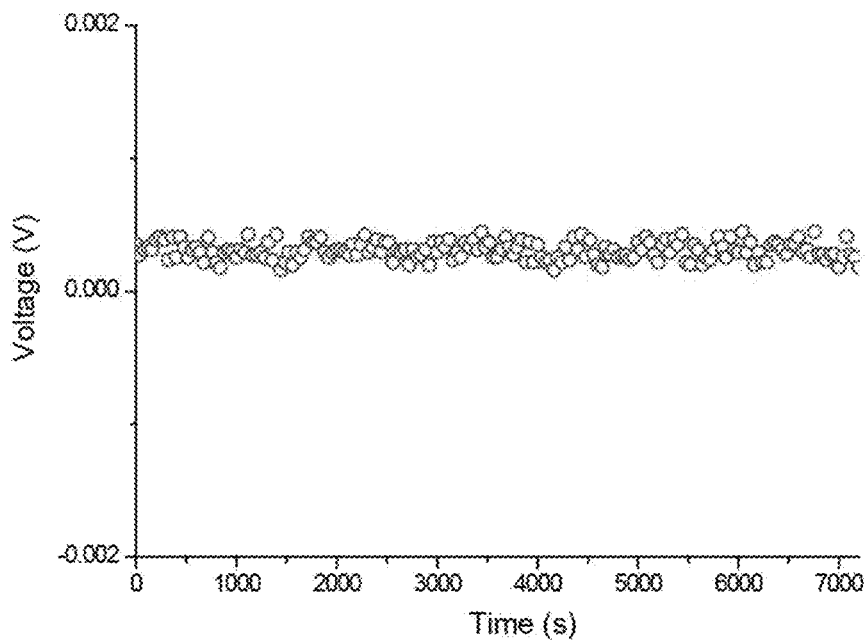
FIG. 29 illustrates measurement of open circuit voltage (OCV) between unused Ag/AgCl and used Ag/AgCl reference electrodes after 10,000 cycles. Herein, the two Ag/AgCl reference electrodes are used as negative and positive electrodes, respectively. A voltage difference between two Ag/AgCl reference electrodes is less than 0.0005V. Such difference in values may be disregarded during galvaanostatic or CV measurement. Further, in the present study, the reference electrode was replaced with new one at every 10,000 cycles (around 1 day)
Figure 30:
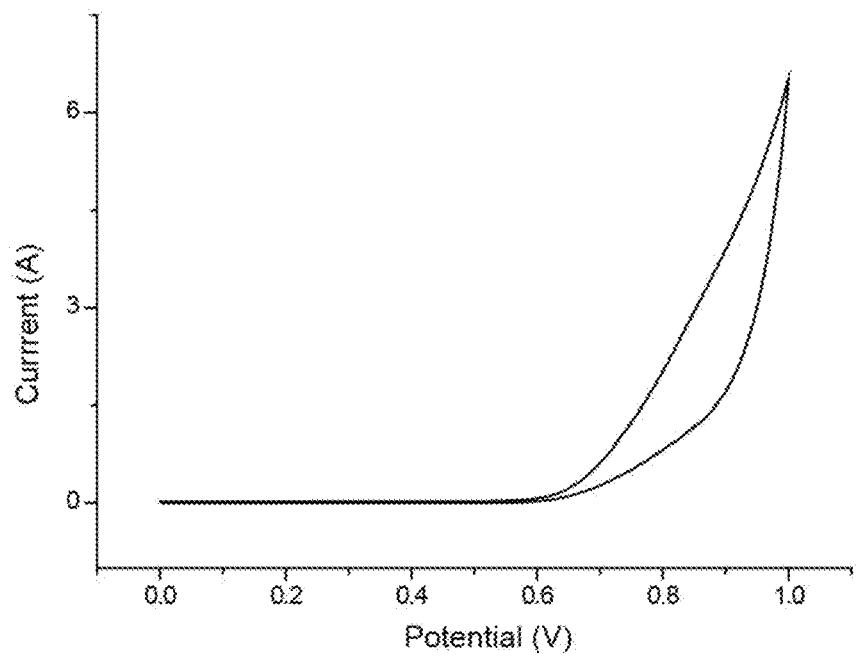
FIG. 30 illustrates CV curves of Pt plate as a working electrode at a voltage in the range of 0 to 1 V (vs. Ag/AgCl). No reaction is observed in the voltage range of 0 to 0.6V, while oxygen gas is formed from electrolyte at a voltage of larger than 0.6V. This result suggests that the highest voltage allowable for stable operation of a three-electrode cell is up to 0.6V.
Figure 31:
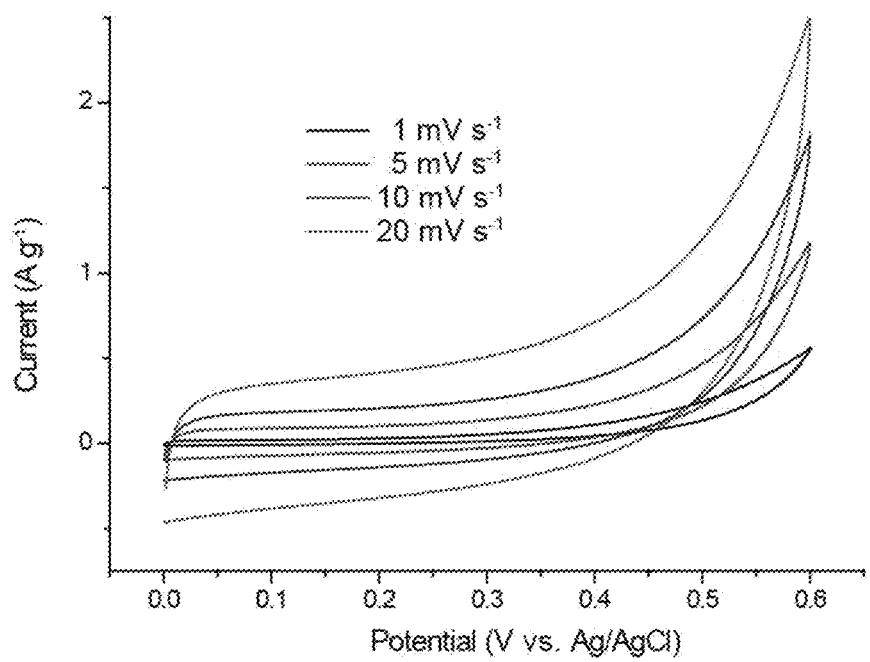
FIG. 31 illustrates CV data of a pure graphene electrode at different scanning rates.
Figure 32:
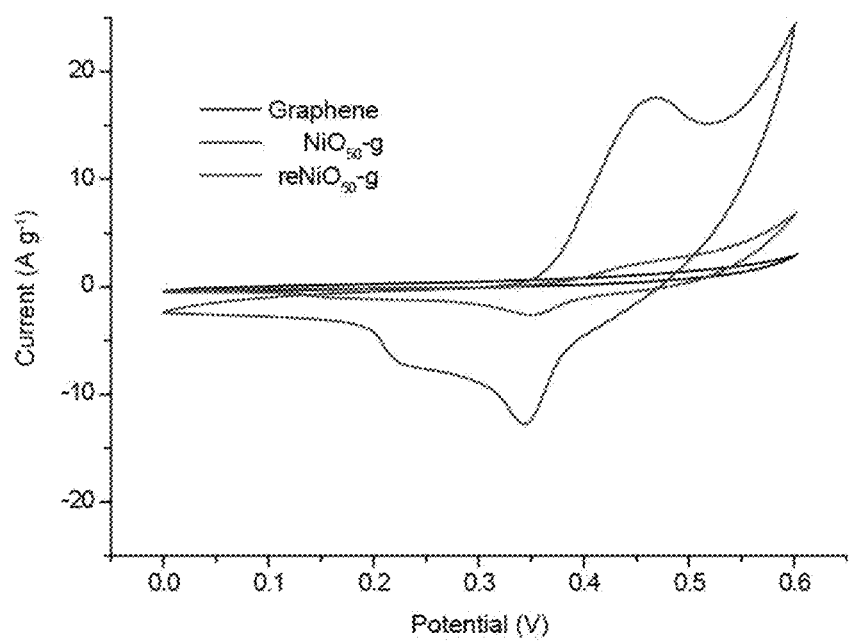
FIG. 32 illustrates CV data of graphene along and NiO$_{50}$-graphene. In particular, CV data of graphene alone, NiO$_{50}$-g and reNiO$_{50}$-g, respectively, are measured at a scan rate of 5 mV/s.
Figure 33:
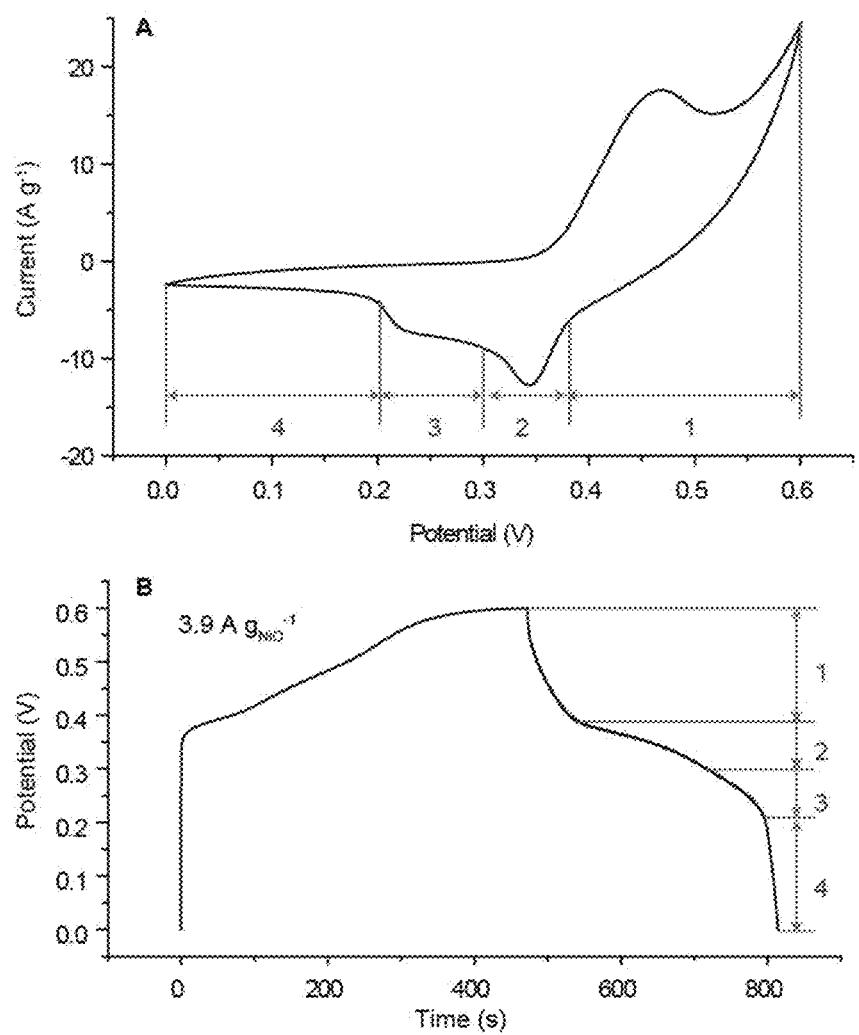
FIG. 33 illustrates comparison of CV data to a discharge profile of reNiO$_{50}$-g. (A) is CV curve of reNiO$_{50}$-g and (B) is a galvanostatic charge/discharge profile of reNiO-g. In the comparison of the CV data with the charge/discharge profile, oxidation peaks numbered as 1 to 4 in the CV curve are well matched with corresponding numbered regions in the discharge profile.
Figure 34:
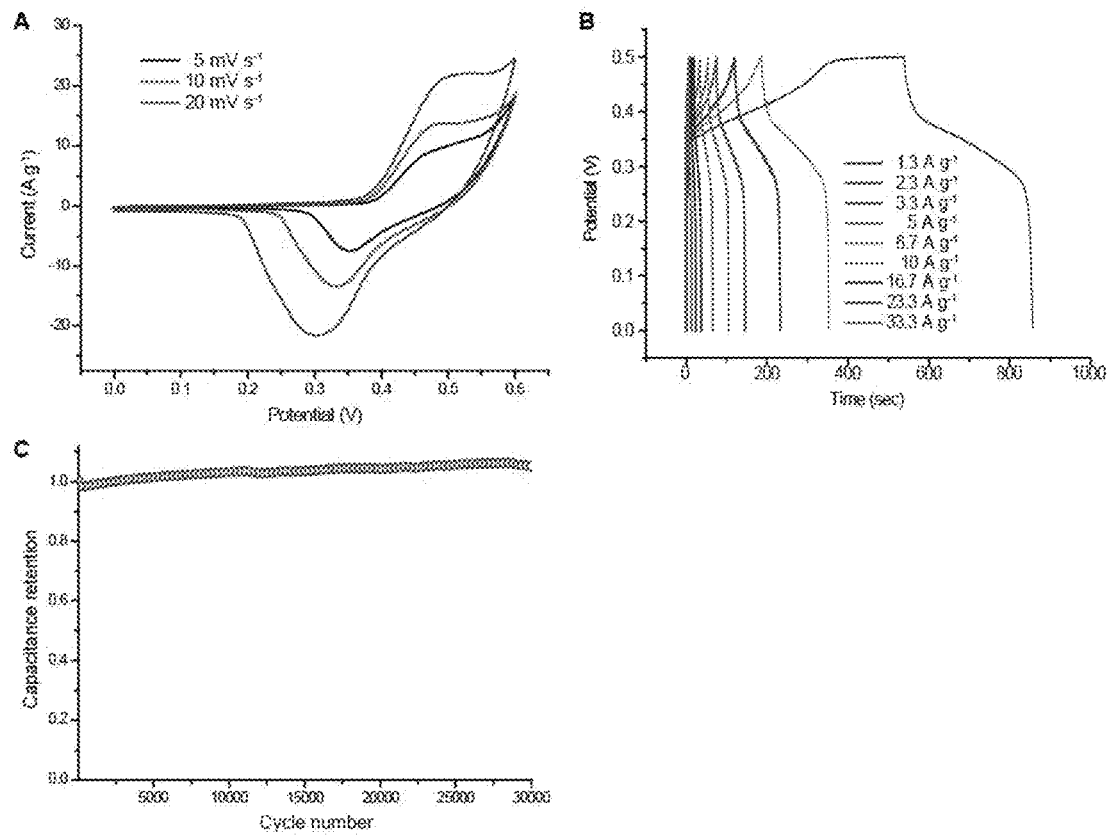
FIG. 34 illustrates electrochemical performance of reNiO$_{30}$-g. (A) shows CV measurement of NiO$_{30}$-g at different scan rates, (B) shows charge/discharge profiles measured by galvanostatic characterization at different current densities, and (C) shows a cyclic test result of NiO$_{30}$-g at a current density of 23.3 A/g.
Figure 35:
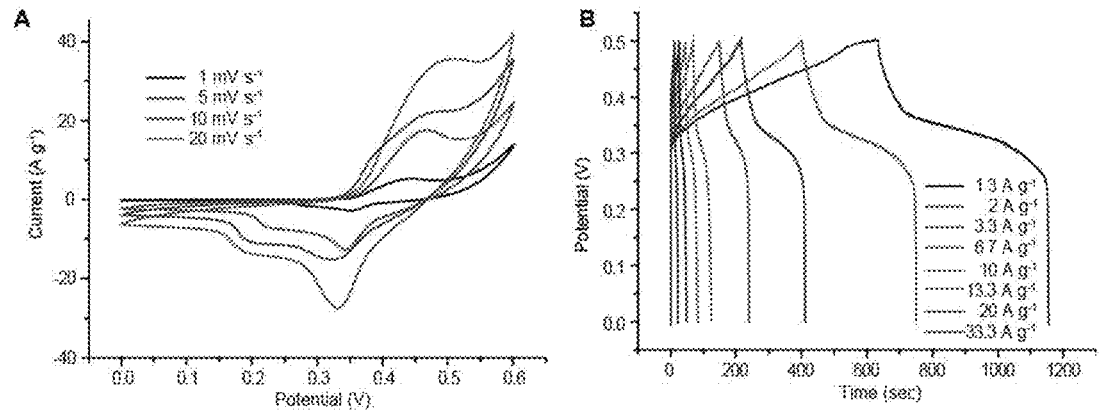
FIG. 35 illustrates electrochemical performance of reNiO$_{50}$-g. (A) shows CV measurement of NiO$_{50}$-g at different scan rates, and (B) shows charge/discharge profiles measured by galvanostatic characterization at different current densities.
Figure 36:
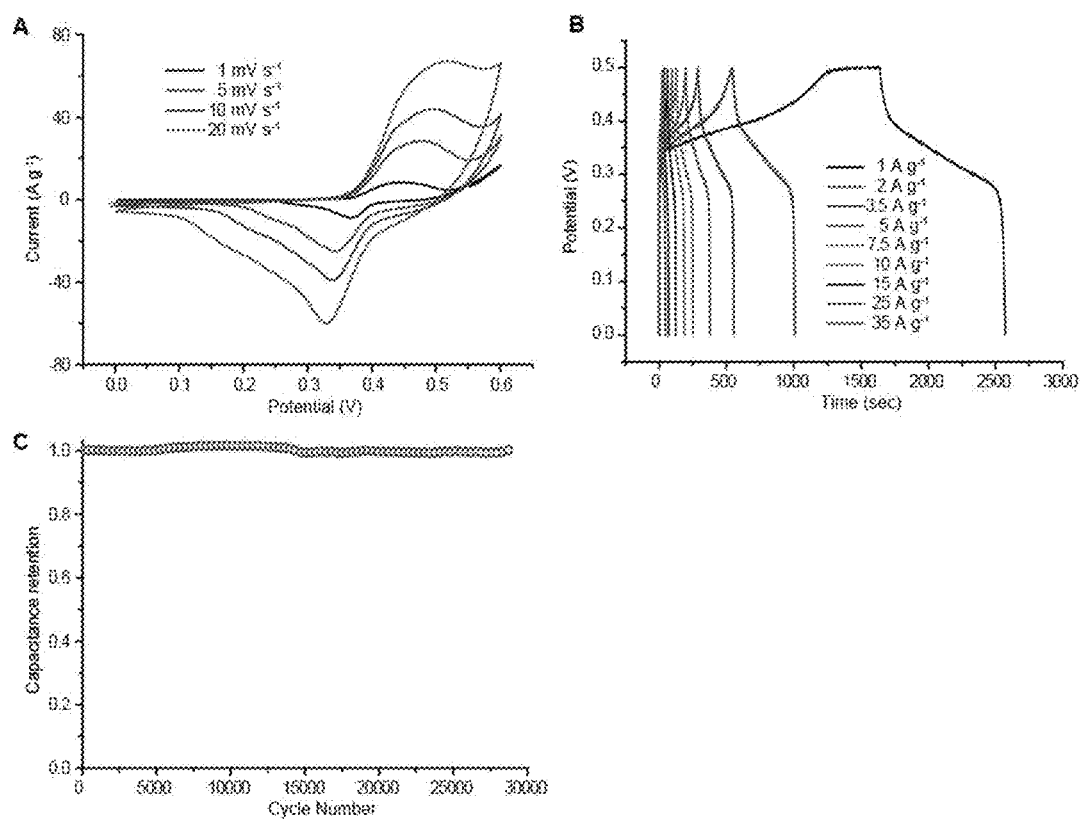
FIG. 36 illustrates electrochemical performance of reNiO$_{70}$-g. (A) shows CV measurement of NiO$_{70}$-g at different scan rates, (B) shows charge/discharge profiles measured by galvanostatic characterization at different current densities, and (C) shows a cyclic test result of NiO$_{70}$-g at a current density of 25 A/g.

Energy storage capacitance characteristics of reNiO-g alone were verified using the three-electrode device. Herein, charges are stored by faradaic reaction of NiO and $OH^-$. Resealed particles play a role of an energy storage site and may also a role of active site based on the scale of the atomic units (FIG. 1e). Further, in order to correlate NiO that can be controlled in adsorption size with the electrochemical characteristics, NiO-g samples including NiO in increased contents of 30, 50 and 70 wt. % were prepared and indicated as $NiO_{30}$-g, $NiO_{50}$-g, and $NiO_{70}$-g (TEM, FIG. 27). NiO content of each sample was measured by thermogravimetric analysis (TGA, FIG. 28). Further, the electrochemical characteristics (FIGS. 29 to 37) were measured in 1M KOH aqueous electrolyte according to CV measurement. The 1M KOH electrolyte was used to maintain stable voltage determined by a voltage (FIG. 30) using a platinum electrode, along with the best and stable reference electrode (FIG. 29). First, CV of a pure graphene electrode (FIG. 31) without NiO was measured to determine a level of contribution to capacitance by the graphene itself. At a span rate of 1 to 20 mV/s, specific capacitance of the graphene was measured to be in a range of 6.9 to 58 $F/g_{graphene}$. Therefore, the pure graphene had a value decreased by 5%, compared to capacitance of optimized reNiO-g (FIG. 32). The capacitance is deduced from the faradaic redox reaction between pure NiO or reNiO and hydroxyl ions. This reaction relates to driving of pseudo-capacitor corresponding to faradaic oxidation and reduction peaks of CV. It also corresponds to gravimetric charge/discharge graphs (FIGS. 33a and 33b). Further, CV data measured at a speed of 5 mV/s before and after resealing (FIGS. 4a to 4c) demonstrated that sizes and areas of negative peaks and positive peaks of reNiO-g have been drastically increased. Such improvements were monitored, respectively, according to adsorbed NiO and CV data measured at different scan rates (FIGS. 34a, 35a and 36a).

Figure 4:
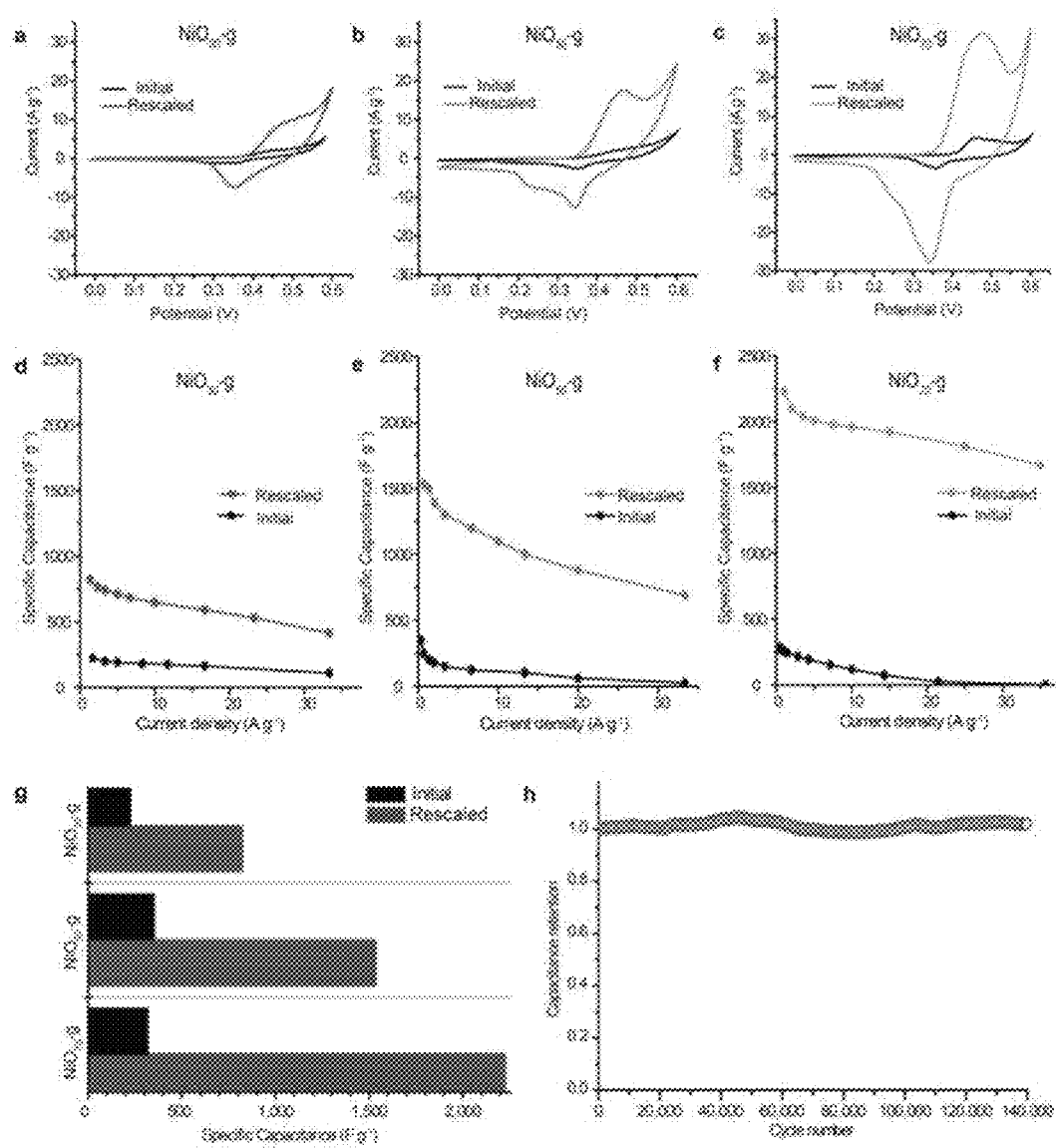
FIG. 4 illustrates evaluation of surface faradaic reaction of NiO resealed by lithiation. Wherein, a, b and c are cyclic voltammetric data of (a) $NiO_{30}$-g (black) and $reNiO_{30}$-g (red), (b) $NiO_{50}$-g (black) and $reNiO_{50}$-g (blue), and (c) $NiO_{70}$-g (black) and $reNiO_{70}$-g (green), respectively; d, e and f are each gravimetric capacitance to different current densities of (d) $NiO_{30}$-g (black) and $reNiO_{30}$-g (red), (e) $NiO_{50}$-g (black) and $reNiO_{50}$-g (blue), and (f) $NiO_{70}$-g (black) and $reNiO_{70}$-g (green), respectively; g illustrates comparison of specific condensing capacities between NiO-g and reNiO-g; and h illustrates results of 140,000 charge/discharge cycle tests for graphene on which NiO is resealed.
Figure 37:
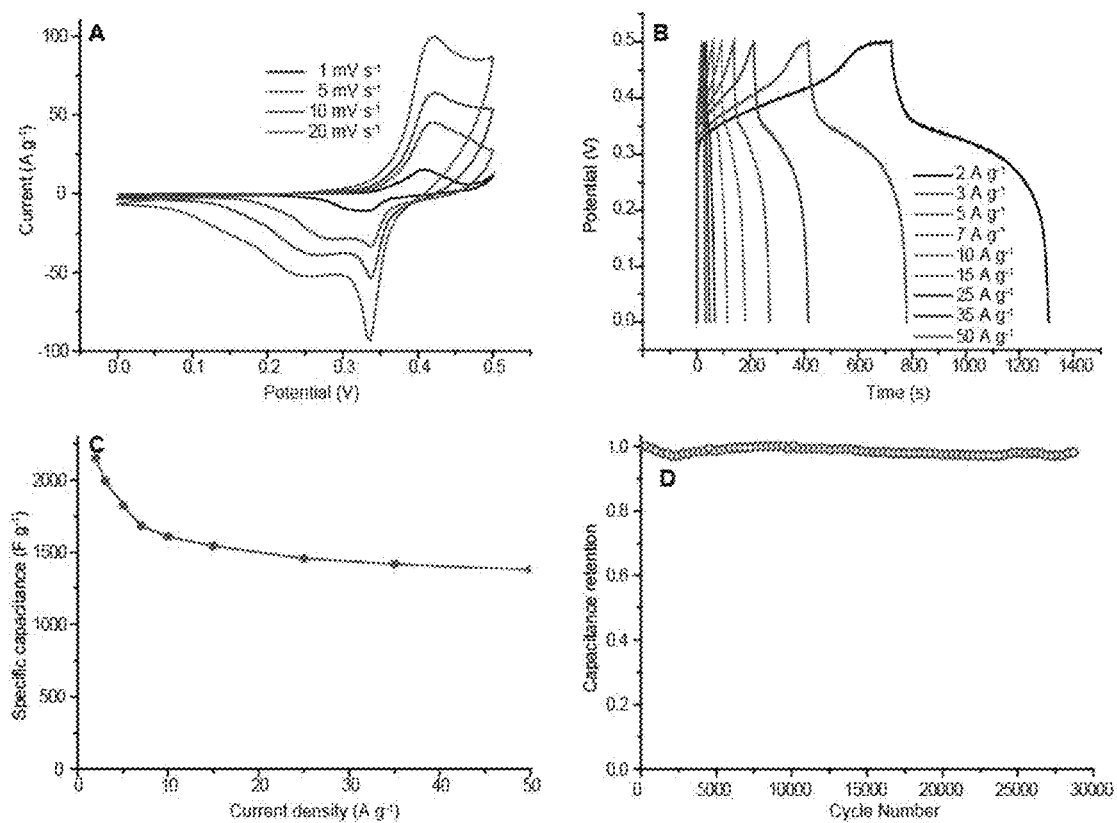
FIG. 37 illustrates electrochemical performance of reNiO$_{30}$-g when using a saturated calomel electrode as a reference. (A) shows CV measurement of NiO$_{70}$-g at different scan rates. (B) shows charge/discharge profiles measured by galvanostatic characterization at different current densities. (C) shows gravimetric capacitance of NiO$_{70}$-g measured at a series of current densities. Herein, the capacitance of 2,151 F/g$_{total\ composite}$ at 2 A/g is comparable to the measured capacitance using a Ag/AgCl reference electrode. (D) shows a cyclic test result of NiO$_{70}$-g when using a SCE reference electrode.

In order to evaluate an increase in capacitance after resealing, gravimetric charge/discharge characteristics of NiO-g and reNiO-g were measured at a voltage between 0 to 0.5 V (compared to Ag/AgCl) under galvanostatic conditions, as illustrated in FIGS. 34b, 35b and 36b, respectively. With regard to an apparent current density, reNiO-g had higher capacitance by several time, than that of NiO-g (FIGS. 4d to 4θ). In this regard, the specific capacitance is determined by a total weight of whole electrodes. $reNiO_{30}$-g, $reNiO_{50}$-g, and $reNiO_{70}$-g had apparent specific capacitances of 820, 1,533 and 2,231 $F/g_{totalcomposite}$, which were obtained from approximately 1.3, 1.3, and 1 A/g, respectively. Further, the measured capacitance substantially exceeded available capacitance through redox reaction from ions to atoms, indicating that there is further contribution to total capacitance. It is considered that the above phenomenon may occur due to graphene delamination by lithium intercalation. Comparing to conventional materials having different morphologies disclosed in the art, the above material had very high capacitance of 2,231 $F/g_{totalcomposite}$, thereby being noticeable. For example, there is NiO nanobelt (1,126 F/g), porous NiO, carbon nanotube (1,326 F/g), NiO/Ni nanocomposites (910 F/g), and the like. $reNiO_{30}$-g, $reNiO_{50}$-g and $reNiO_{70}$-g have high capacitances of 415, 690 and 1,670 $F/g_{totalcomposite}$, respectively, even at a high current of 33.3 or 35 A/g. In every case, the rescaling process may noticeably improve pseudo-capacitive characteristics of NiO-g. Surprisingly, it can be seen that increased amount of NiO is more effective to improve the capacitance (FIG. 4g). Further, it was ascertained that galvanostatic cycle characteristics of $reNiO_{50}$-g were well maintained even at a current density of 20 A/g in more than 100,000 cycles (FIG. 4h). Herein, $reNiO_{30}$-g and $reNiO_{70}$-g had similar capacitance values and maintained long term cycle characteristics (FIGS. 34c and 36c). Excellent stability means that rescaled particles are not affected by a change in material such as linkage loss of particles in a current path even when time passes. Such prominent characteristics of reNiO-g as described above may further ensure use of alternative reference electrode (FIG. 37).

Figure 5:
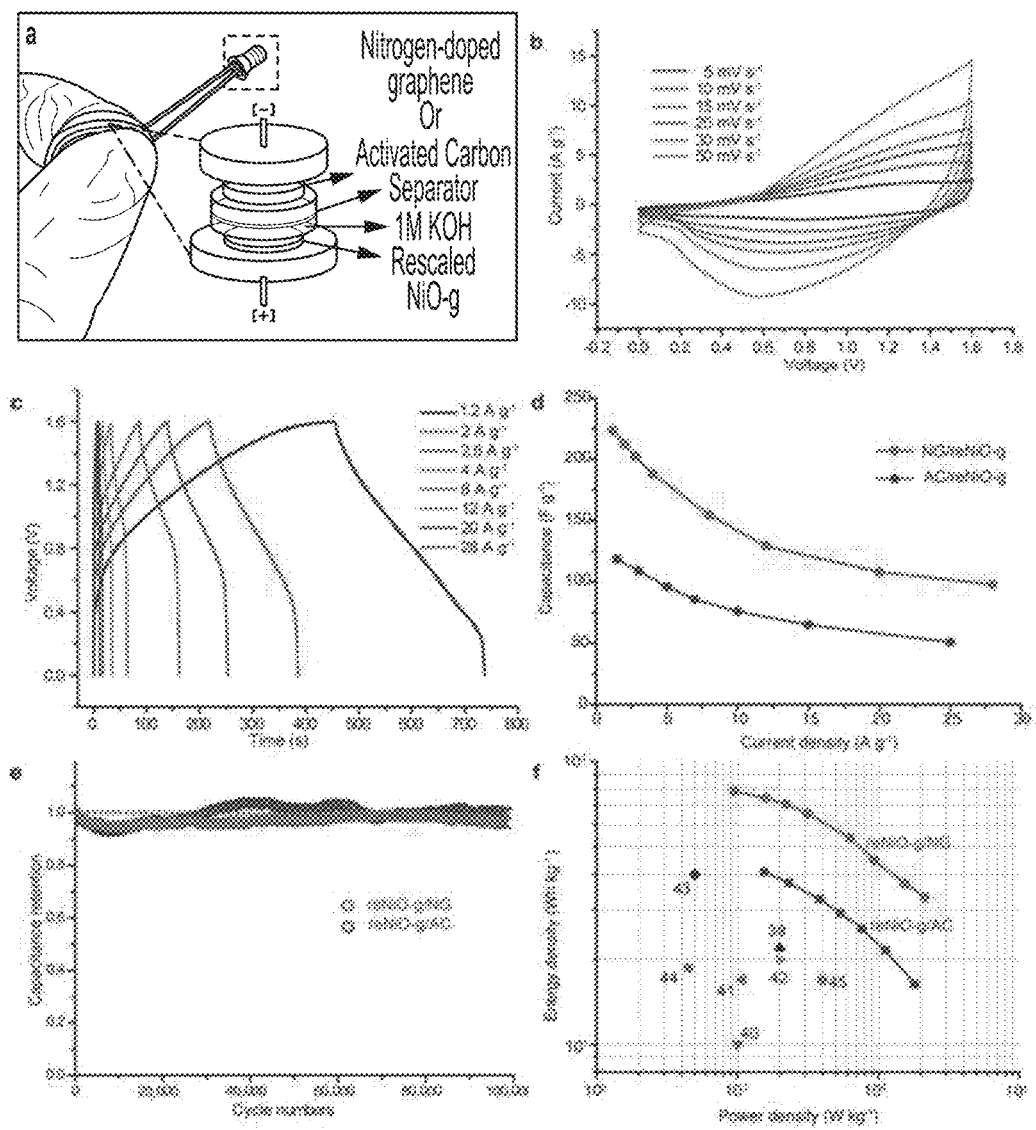
FIG. 5 illustrates electrochemical characteristics of $reNiO_{70}$-g/NG asymmetric full cell. Wherein, a is a coin cell photograph of an asymmetric supercapacitor for storage of electric energy as much as LED can emit light, and an inset photograph illustrating partial disposition of reNiO-g/NG asymmetric full cell; b is CV determination of two electrodes asymmetric full cell at different scan speeds; c is charge-discharge profile determined by measuring electrostatic currents at different current densities; d is gravimetric capacitance of the dispositions of reNiO-g/NG and reNiO-g/AC full cells, which was measured at sequence current densities; e is cycle characteristics of reNiO-g/NG and reNiO-g/AC asymmetric full cell determined at 12 $Ag^1$ current density; and f is Ragone plot of reNiO-g/NG and reNiO-g/AC capacitors and introduction of reference documents (39 to 45) reported in the art. All data of the above drawings are based on asymmetric capacitor, which was calculated using a total weight of two electrodes.
Figure 38:
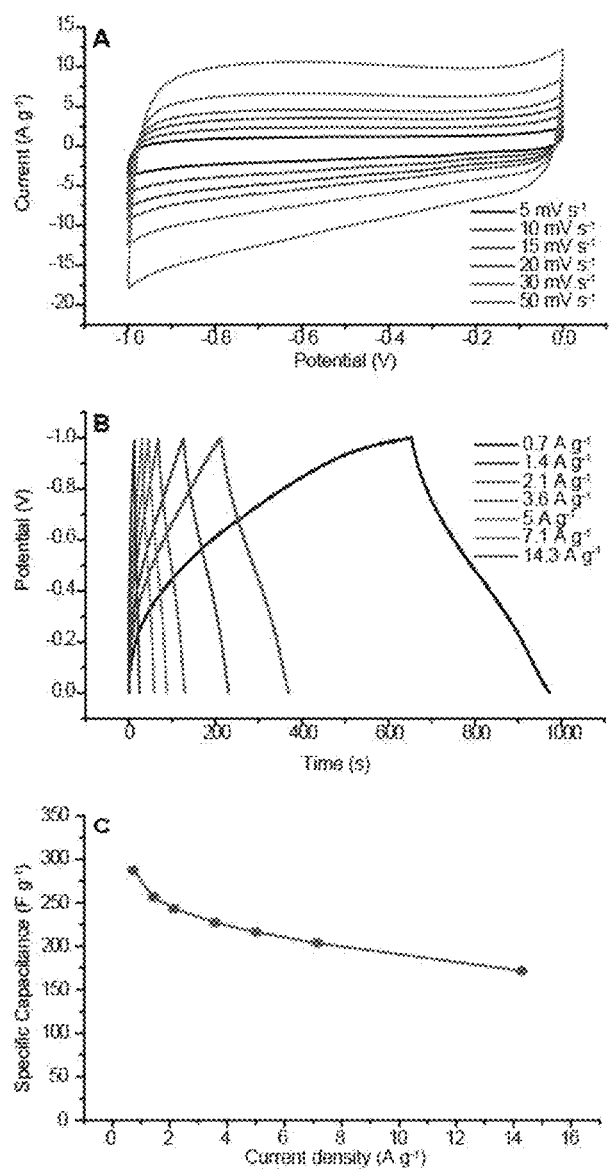
FIG. 38 illustrates electrochemical characteristics of nitrogen-doped graphene (NG) as a negative electrode for an asymmetric supercapacitor. (A) shows CV measurement of NG at different scan rates. (B) shows charge/discharge profiles measured by galvanostatic characterization at different current densities. (C) shows gravimetric capacitance of NG measured at a series of current densities. Herein, the electrochemical performance is measured using 1 M KOH aqueous electrolyte, an Ag/AgCl reference electrode, and a platinum wire counter electrode.
Figure 39:
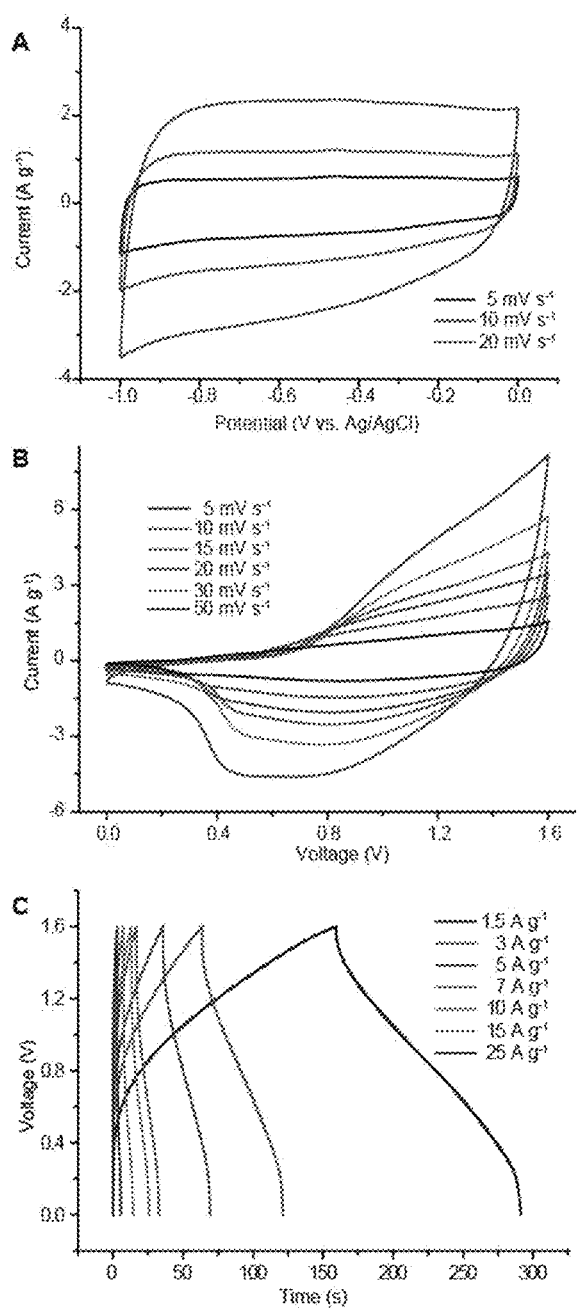
FIG. 39 illustrates electrochemical characteristics of activated carbon (AC) as a negative electrode and the reNiO$_{70}$-g/AC asymmetric capacitor. (A) shows CV measurement of AC at different scan rates. Herein, the specific capacitance of AC is 122 F/g at a scan rate of 5 mV/s. (B) shows CV measurement of reNiO-g/AC asymmetric capacitor at different scan rates. Two redox peaks indicate the pseudo-capacitive property. (C) shows charge/discharge profile of the reNiO-g/AC asymmetric capacitor measured by galvanostatic characterization at different current densities.

In order to establish possibility of fabricating rescaled metal oxide particles into a full cell device, reNiO-g was used as a positive electrode while a negative electrode was prepared by binding nitrogen-doped graphene (NG) thereto, thus fabricating an asymmetric full cell capacitor device. It was found that the device in an assembled coin form generates a power enough to drive LED (FIG. 5a). A drive voltage was determined by applying NG (FIG. 38) and reNiO-g to a three-electrode system, respectively, and conducting galvanostatic measurement and CV measurement. The full asymmetric capacitor electrode (reNiO-g/NG) was driven at a voltage of 1.6V and at different rates of CV measurement, as illustrated in FIG. 5b. Although this device is driven at a wide range of current densities (1.2 to 28 A/g) (FIG. 5c), it shows very stable characteristics. The full cell device at the current density of 1.2 A/g exhibited highest capacitance of 223 $F/g_{reNiO-g/NG}$ (FIG. 5d). $g_{reNiO-g/NG}$ indicates a total weight including the negative and positive electrodes. The specific capacitance according to the total weight of the device is limited by specific capacitance of the negative electrode (285 $F/g_{NG}$, FIG. 38). Also, an asymmetric full cell including activated carbon as a positive electrode and reNiO-g as a negative electrode was further fabricated (FIGS. 5d and 39). The reNiO-g/AC capacitor is a full cell showing highest capacitance of 118 $F/g_{reNiO-g/AC}$ at 1.5 A/g, which is almost close to the maximum capacitance value (122 F/g$_{AC}$, FIG. 39) when AC was measured using the three-electrode system.

Moreover, electrochemical reactions with good combination of two devices may induce superior stability of the devices at a high current density of 12 A/g. It is worthy of notice that, when the metal oxide is compared to asymmetric capacitors used as alternative positive electrode, almost 100% capacitors without exception are highly maintained in more than 100,000 cycles. The energy density and power density of the full cell were also determined from the galvanostatic charge/discharge graphs and results thereof were arranged in FIG. 5E For reNiO-g/NG capacitor, the highest energy density of less than 80 Wh/kg at the power density of about 1,000 W/kg was obtained while the highest power density of 21,418 W/kg at the energy density of 33 Wh/kg could be obtained (FIG. 5f). The measured characteristics were very prominent, even compared to characteristics of NiO, alternative capacitor made of nickel hydroxide, and an asymmetric capacitor device made of manganese oxide. Therefore, such resealing strategy as described above may become a new solution in fabricating an energy storage device, thus coming to the conclusion that this is applicable to a variety of other applications.

The energy storage device based on resealed metal particles according to the present invention exhibited elelctrostatic capacitance several times higher than before resealing of metal oxide. Further, since the resealed metal particles have a size of less than 1 nanometer on the scale of atomic units, interference between particles disappears to achieve cycle life characteristics that 100% performance is maintained in more than 100,000 cycles, thereby having industrial applicability.

While the present invention has been described with reference to the preferred embodiments, it will be understood by those skilled in the related art that various modifications and variations may be made therein without departing from the scope of the present invention as defined by the appended claims.

What is claimed is:

1. An energy storage device based on atomic clusters including transition metal oxide rescaled by lithiation, comprising: a carbon support; and transition metal nanoparticles dispersed thereon to be rescaled on the support by intercalation/deintercalation of lithium ions, wherein divalent transition metal ion ($M^{2+}$) of the transition metal nanoparticles is reversely changed to zero-valent transition metal state ($M^0$) during lithiation and delithiation, and wherein the divalent transition metal ion reacts with atomic unit scale oxygen by lithiation, and is maintained on the scale of the atomic units when a duster returns to the transition metal oxide state while removing lithium in a M:LiO$_x$ core-shell structure, wherein the transition metal oxide is at least one selected from $RuO_2$, $IrO_2$, $MnO_2$, $Mn_3O_4$, $Co_3O_4$, $NiCo_2O_4$, $V_2O_5$, $SnO_2$, $TiO_2$, $MoO_3$, and $Fe_2O_3$.

2. The device according to claim 1, wherein the carbon is at least one selected from graphene, carbon nanotube and activated carbon.

3. The device according to claim 1, wherein the transition metal particle has a size of 0.6 to 1 nanometer.

4. A supercapacitor with high current density of 12 A/g and long term cycle of 100,000 or more characteristics fabricated using the energy storage device based on nanocrystals including the rescaled transition metal oxide according to claim 1.

* * * * *

UNITED STATES PATENT AND TRADEMARK OFFICE
CERTIFICATE OF CORRECTION

PATENT NO. : 10,164,239 B2
APPLICATION NO. : 14/754478
DATED : December 25, 2018
INVENTOR(S) : Jeung-Ku Kang et al.

It is certified that error appears in the above-identified patent and that said Letters Patent is hereby corrected as shown below:

On the Title Page

Item (57)

Abstract, Line 2: Please replace "resealed" with --rescaled--.

Abstract, Line 6: Please replace "resealing" with --rescaling--.

Abstract, Line 8: Please replace "resealed" with --rescaled--.

Abstract, Line 9: Please replace "resealed" with --rescaled--.

Abstract, Line 13: Please replace "resealing of metal oxide. Since the resealed" with --rescaling of metal oxide. Since the rescaled--.

In the Claims

Column 22, Line 18 (Claim 1): Please replace "duster" with --cluster--.

Signed and Sealed this
Sixteenth Day of April, 2019

Andrei Iancu
*Director of the United States Patent and Trademark Office*